United States Patent
Matoba

(10) Patent No.: US 7,756,140 B2
(45) Date of Patent: Jul. 13, 2010

(54) RELAY DEVICE, PATH CONTROL METHOD, AND PATH CONTROL PROGRAM

(75) Inventor: Kazumine Matoba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 467 days.

(21) Appl. No.: 11/602,633

(22) Filed: Nov. 21, 2006

(65) Prior Publication Data

US 2008/0008192 A1 Jan. 10, 2008

(30) Foreign Application Priority Data

Jul. 7, 2006 (JP) ............................. 2006-187903

(51) Int. Cl.
*H04L 12/28* (2006.01)
(52) U.S. Cl. .................. 370/395.54; 370/401
(58) Field of Classification Search .................. None
See application file for complete search history.

(56) References Cited

U.S. PATENT DOCUMENTS

| | | | | |
|---|---|---|---|---|
| 5,724,510 | A * | 3/1998 | Arndt et al. .................. | 709/220 |
| 5,920,699 | A * | 7/1999 | Bare ........................... | 709/225 |
| 6,754,716 | B1 * | 6/2004 | Sharma et al. ............... | 709/238 |
| 7,356,032 | B1 * | 4/2008 | Sumorok .................... | 370/392 |
| 2006/0088037 | A1 * | 4/2006 | Finley et al. ............ | 370/395.54 |
| 2006/0206588 | A1 * | 9/2006 | Saika et al. ................. | 709/219 |
| 2007/0201490 | A1 * | 8/2007 | Mahamuni ............. | 370/395.54 |

FOREIGN PATENT DOCUMENTS

JP 2003-318934 11/2003

* cited by examiner

*Primary Examiner*—Chirag G Shah
*Assistant Examiner*—Jenkey Van
(74) *Attorney, Agent, or Firm*—Katten Muchin Rosenman LLP

(57) ABSTRACT

The relay device, comprising an address correspondence holding section which holds, for each of the terminals, the IP address and real MAC address of the terminal and a virtual MAC address being a MAC address that is virtual; a proxy reply section which, when a first ARP request frame that seeks the acquisition of the virtual MAC address from the terminal is received, reads the virtual MAC address of the corresponding terminal from the address correspondence holding section and sends back the virtual MAC address to the terminal; a MAC address conversion section which receives a first frame addressed to the virtual MAC address when the first frame is sent and received between the terminals, performs conversion of the virtual MAC address and real MAC address for the MAC address of the first frame, and sends back a converted second frame; and a security check section.

15 Claims, 23 Drawing Sheets

CONSTITUTIONAL EXAMPLE OF THE PRESENT INVENTION
ACCORDING TO THE THIRD EMBODIMENT

NETWORK CONFIGURATION EXAMPLE
OF FIRST EMBODIMENT

CONSTITUTIONAL EXAMPLE OF MAC FRAME

FLOWCHART OF SECURITY SWITCH OF FIRST EMBODIMENT

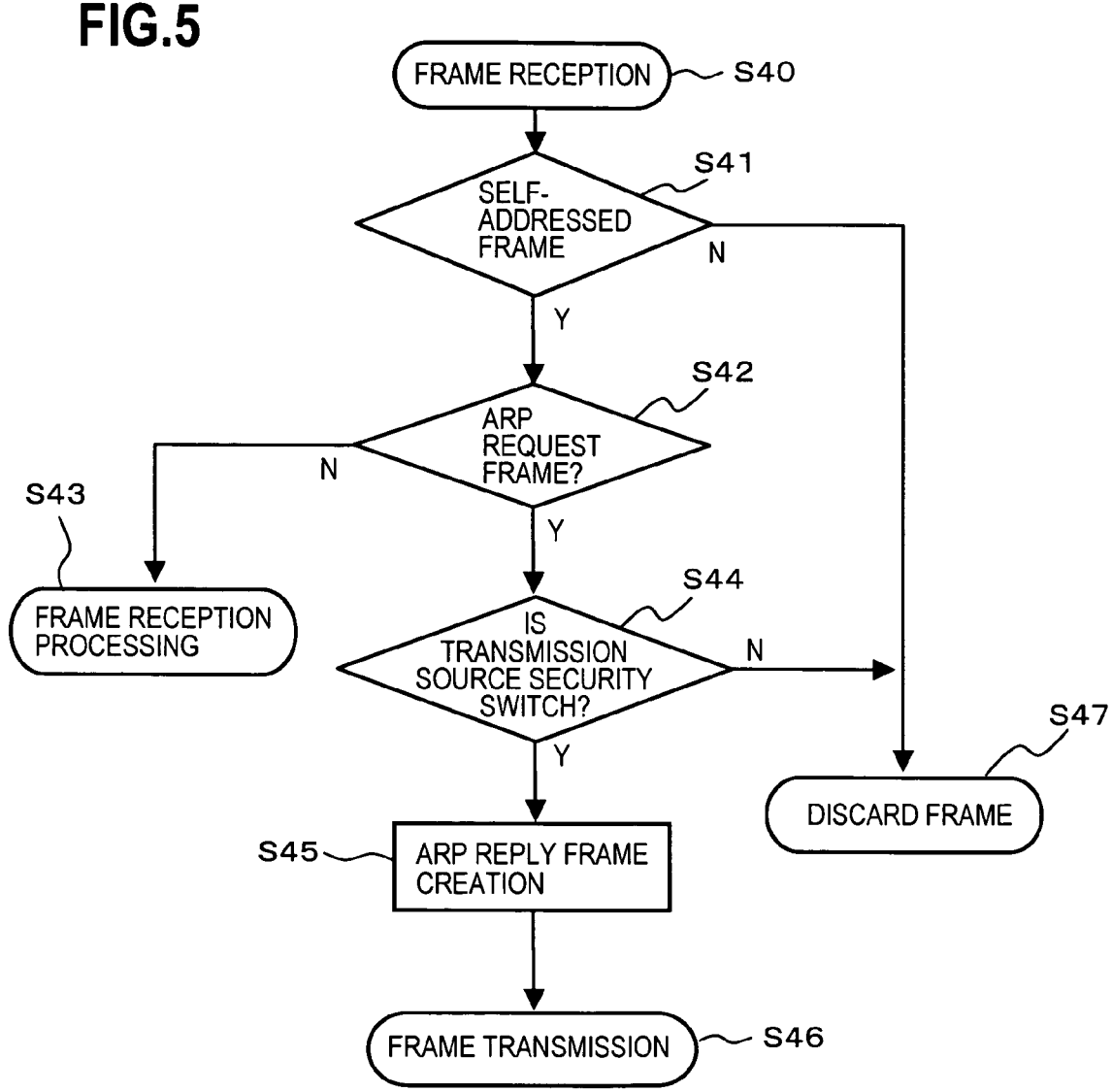
FLOWCHART FOR TERMINAL OF RESPECTIVE EMBODIMENTS

FIG.6A

| IP ADDRESS | VIRTUAL MAC ADDRESS | REAL MAC ADDRESS |
|---|---|---|
| 10.0.0.2 | 02:11:11:11:11:02 | 00:11:11:11:11:02 |
| 10.0.0.3 | 02:11:11:11:11:03 | 00:11:11:11:11:03 |

CONSTITUTIONAL EXAMPLE OF ADDRESS CORRESPONDENCE HOLDING SECTION

FIG.6B

| MAC ADDRESS | PORT NUMBER |
|---|---|
| 00:11:11:11:11:02 | Port1 |
| 02:11:11:11:11:02 | Port2 |
| 02:11:11:11:11:03 | Port3 |
| 00:11:11:11:11:03 | Port4 |

EXAMPLE OF LEARNING TABLE OF L2SW_C

FIG.6C

| MAC ADDRESS | PORT NUMBER |
|---|---|
| 00:11:11:11:11:02 | Port1 |
| 02:11:11:11:11:02 | Port1 |
| 02:11:11:11:11:03 | Port1 |
| 00:11:11:11:11:03 | Port3 |

EXAMPLE OF LEARNING TABLE OF L2SW_D

FIG.7A

| IP ADDRESS | MAC ADDRESS |
|---|---|
| 10.0.0.3 | 02:11:11:11:11:03 |

EXAMPLE OF ARP TABLE FOR TERMINAL A

FIG.7B

| IP ADDRESS | MAC ADDRESS |
|---|---|
| 10.0.0.2 | 02:11:11:11:11:02 |

EXAMPLE OF ARP TABLE OF TERMINAL B

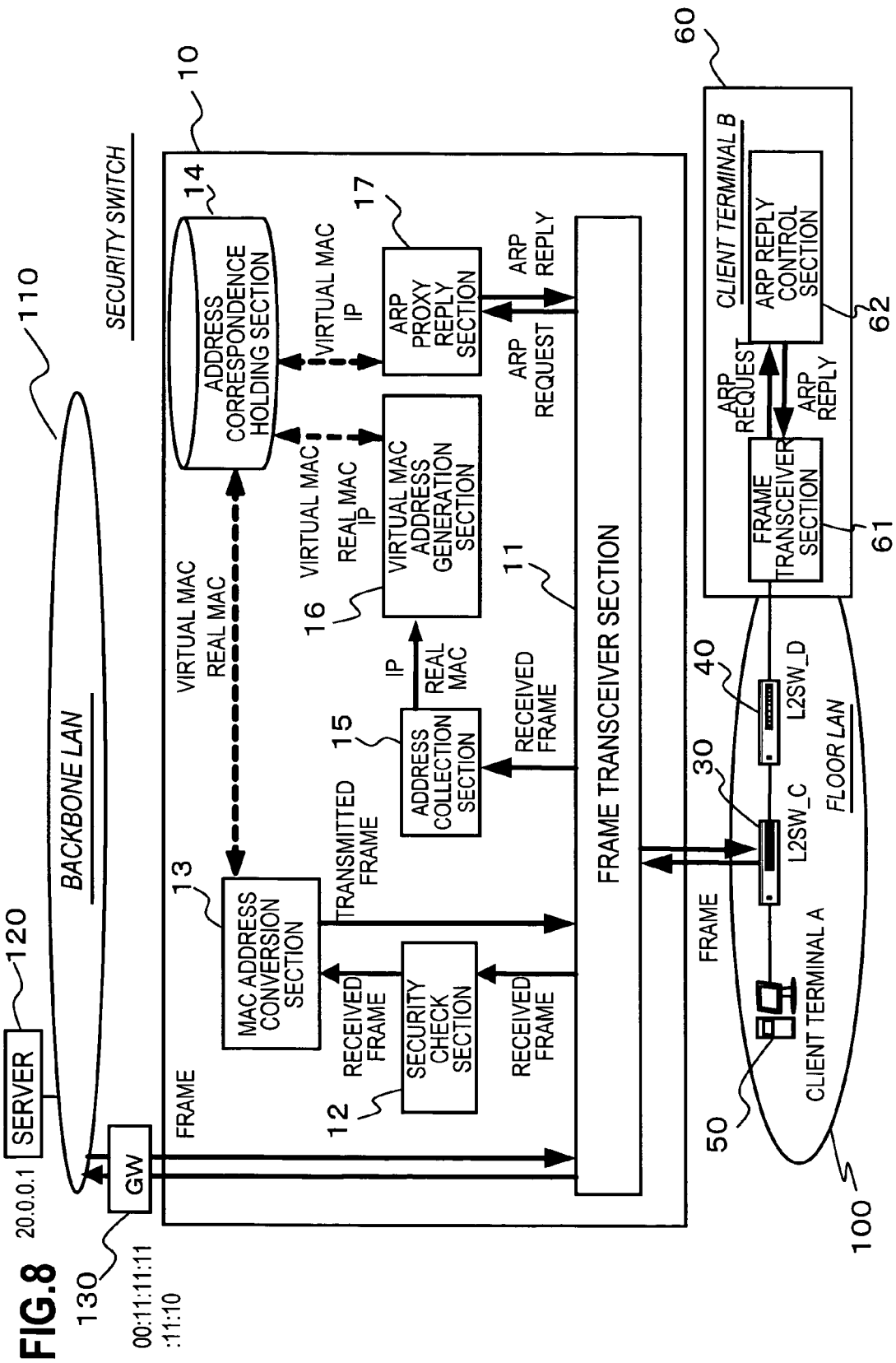

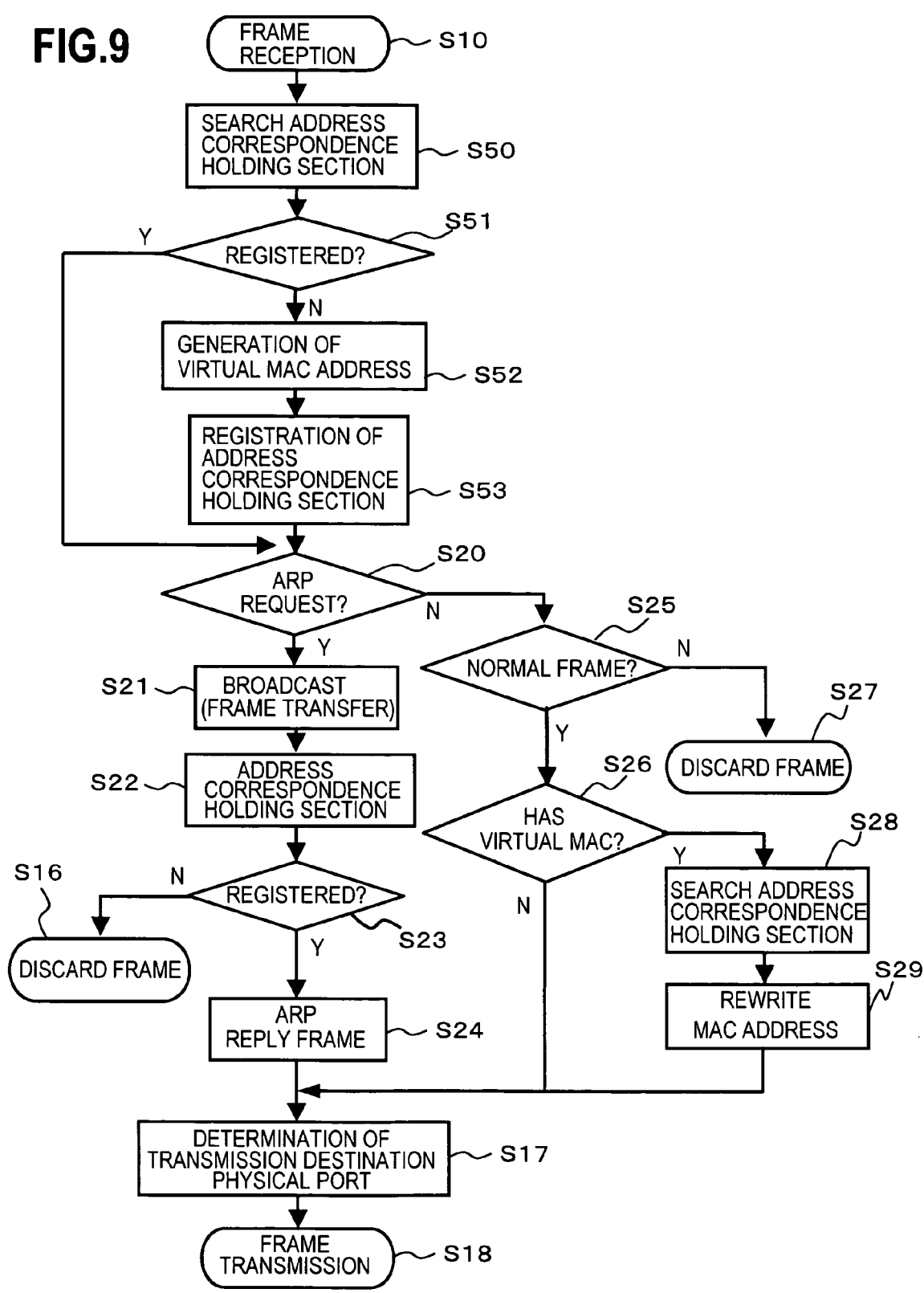
FLOWCHART OF SECURITY SWITCH ACCORDING TO THE SECOND EMBODIMENT

NETWORK CONFIGURATION EXAMPLE OF THIRD EMBODIMENT

FIG.11 CONSTITUTIONAL EXAMPLE OF THE PRESENT INVENTION ACCORDING TO THE THIRD EMBODIMENT

SECURITY SWITCH ACCORDING TO THIRD EMBODIMENT

FIG.13 CONSTITUTIONAL EXAMPLE OF THE PRESENT INVENTION ACCORDING TO THE FOURTH EMBODIMENT

FIG.14 FLOWCHART FOR SECURITY SWITCH ACCORDING TO FOURTH EMBODIMENT

FLOWCHART OF SECURITY SWITCH
ACCORDING TO FOURTH EMBODIMENT
(DISCRIMINATION OF NONCORRESPONDING TERMINAL)

| CORRESPONDING TERMINAL | IP ADDRESS | VIRTUAL MAC ADDRESS | REAL MAC ADDRESS |
|---|---|---|---|
| 1 | 10.0.0.2 | 02:11:11:11:11:02 | 00:11:11:11:11:02 |
| 1 | 10.0.0.3 | 02:11:11:11:11:03 | 00:11:11:11:11:03 |
| 0 | 10.0.0.4 | 02:11:11:11:11:04 | 00:11:11:11:11:04 |

CONSTITUTIONAL EXAMPLE OF ADDRESS
CORRESPONDENCE HOLDING SECTION ACCORDING TO
FOURTH EMBODIMENT

FIG.17 CONSTITUTIONAL EXAMPLE OF THE PRESENT INVENTION ACCORDING TO FIFTH EMBODIMENT

FLOWCHART FOR SECURITY SWITCH ACCORDING TO THE FIFTH EMBODIMENT

EXAMPLE OF NETWORK CONFIGURATION
ACCORDING TO SEVENTH EMBODIMENT

FIG.21

```
10:26:48.765497 IP 10.0.0.2.45588 > 10.0.0.3.23: . ack 2867514952 win 24820

10:26:48.765582 IP 10.0.0.3.23 > 10.0.0.2.45588: P 1:148(147) ack 0 win 5840

10:26:48:865468 IP 10.0.0.2.45588 > 10.0.0.3.23: . ack 148 win 24820

10:26:48.865532 IP 10.0.0.3.23 > 10.0.0.2.45588: P 148:325(177) ack 0 win 5840
```

LOG EXAMPLES

FLOWCHART OF SECURITY SWITCH OF SEVENTH EMBODIMENT

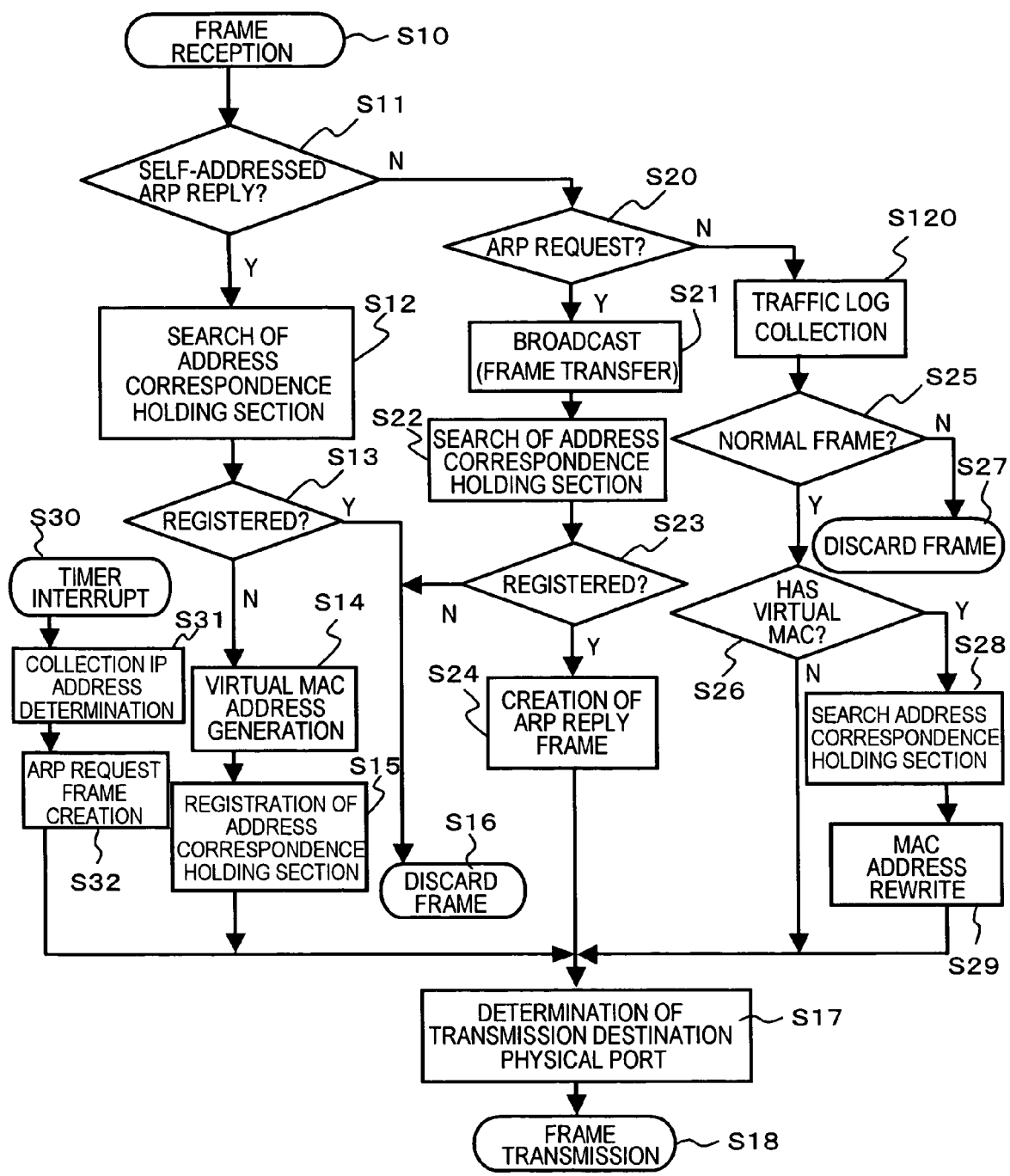
FLOWCHART OF SECURITY SWITCH OF SEVENTH EMBODIMENT

EXAMPLE OF ARP COMMUNICATION

EXAMPLE OF COMMUNICATION IN CONVENTIONAL FLOOR LAN

RELAY DEVICE, PATH CONTROL METHOD, AND PATH CONTROL PROGRAM

CROSS-REFERENCE TO RELATED APPLICATIONS

This application is based upon and claims the benefit of priority from the prior Japanese Patent Application No. 2006-187903, filed on Jul. 7, 2006, the entire contents of which are incorporated herein by reference.

BACKGROUND OF THE INVENTION

1. Field of the Invention

The present invention relates to a relay device that performs LAN path control, a path control method, and a path control program. The present invention relates more particularly to a relay device or the like that implements security improvements including the collection of logs.

2. Description of the Related Art

In recent years, damage to the information resources in enterprises caused by viruses and worms and so forth in networks is a problem. Cases where switches and routers and so forth with security functions are installed as one countermeasure have increased.

Such security switches continually monitor traffic passing through them and have a function for preventing extended damage by discarding frames of the traffic upon sensing an anomalous traffic pattern such as a Dos (Denial of Service) attack, worm infection activity.

An ordinary floor LAN is mostly connected to a plurality of terminals by means of a low-function switching hub or repeater hub or the like. Such a floor LAN is normally installed at the boundary point between the floor LAN and the backbone LAN so that the network device configuration is not affected in connecting a security switch.

FIG. 24A shows a conventional constitutional example of a case where a security switch is provided in a floor LAN.

A security switch 200 is provided between a backbone LAN and a floor LAN, and layer-2 switches (L2SW) 210 and 220 are disposed in subordination to the security switch 200. A client terminal A230 and client terminal B240 are each connected to the respective layer-2 switches 210 and 220. In this case, the terminals A230 and B240 are arranged within the same floor LAN.

In a network configuration connected in this way, when communication is made between terminals A230 and B240, an address acquisition operation is first performed by using an address resolution protocol known as ARP (Address Resolution Protocol).

As shown in FIG. 24A, (1) terminal A230 transmits, by means of a broadcast, an ARP request frame that includes the IP address of the terminal B240 and (2) terminal B240 transmits an ARP reply frame that includes its own MAC (Media Access Control) address to the ARP request frame to terminal A.

As a result of this operation, the terminal A230 acquires the MAC address of terminal B240. Thereafter, terminal A230 is able to transmit a communication frame to the MAC address of terminal B240 (See FIG. 24B). Thereupon, the layer-2 switches 210 and 220 search for learning tables held by themselves by using the MAC address as the search key and transmit frames to the destination physical port (physical port to which terminal B240 is connected). Terminal B240 then performs processing to receive frames because the received frames have its own MAC address.

Furthermore, as an example of such conventional technology, a switching hub comprises a table that stores a dummy MAC address that corresponds to a residential port, for example, and, if the destination MAC address of a frame received from the residential port is a dummy MAC address, the switching hub replaces the destination MAC address of the frame with the MAC address of a node that is connected to another residential port corresponding with the dummy MAC address in order to relay a frame (Japanese Patent Application No. 2003-318934, for example).

However, as shown in FIGS. 24A and 24B, in the communications between terminals in the same floor LAN, the transfer of frames is performed only by the layer-2 switches 210 and 220. Hence, because frames are not transferred to the security switch 200, the security monitoring by the security switch 200 cannot be performed.

In this case, when a terminal that has been infected by a worm is connected, for example, worm-infected frames are spread in the floor LAN and a state where all the terminals in the same floor LAN receive worm-infection damage occurs.

Further, in Japanese Patent Application No. 2003-318934, although no problems are produced because the transferred frames pass through the switching hub 101 between nodes connected to different physical ports, when communication is made only between a plurality of nodes 113 and 114 of the same port, the frames no longer pass through the switching hub 101 and there is then the problem that security monitoring cannot be performed in the same way.

On the other hand, avoidance of the above problem may also be considered by providing the layer-2 switches 210 and 220 in FIG. 24A with a security function. However, when the layer-2 switches 210 and 220 are provided with such a security function, an increase in costs and production requirements is induced all the more. Therefore, an increase in security is desirable without changing the existing network configuration as far as is possible.

Although the above examples were mentioned with respect to security, when communication is performed only between terminals 230 and 240 for exactly the same reasons, the security switch 200 is unable to collect a communication log.

SUMMARY OF THE INVENTION

Therefore, the present invention was conceived in view of the above problems and an object of the present invention is to provide a relay device that implements security improvements including the collection of logs for the terminals in the floor LAN without changing the existing network configuration, and to provide a path control method and path control program.

In order to achieve the above object, an embodiment of the present invention is a relay device in which a single or a plurality of layer-2 switches are connected in subordination to the same physical port and a single or a plurality of terminals are connected in subordination to the layer-2 switches, having: an address correspondence holding unit which holds, for each of the terminals, an IP address and real MAC address of the terminal and a virtual MAC address being a MAC address that is virtual; a proxy reply unit which reads the virtual MAC address of the corresponding terminal from the address correspondence holding unit upon receiving a first ARP request frame that seeks the acquisition of the virtual MAC address from the terminal, and sends back the virtual MAC address to the terminal; and a MAC address conversion unit that receives a first frame addressed to the virtual MAC address when the first frame is sent and received between the terminals, performs conversion of the virtual MAC address and real MAC address for the MAC address of the first frame and sends back a converted second frame.

Further, in order to achieve the above object, a further embodiment of the present invention is a network system in which a single or a plurality of layer-2 switches are connected in subordination to the same physical port of the relay device and a single or a plurality of terminals are connected in subordination to the layer-2 switches, wherein the relay device has: an address correspondence holding unit which holds, for each of the terminals, a IP address and real MAC address of the terminal and a virtual MAC address being a MAC address that is virtual; a proxy reply unit which, when a first ARP request frame that seeks the acquisition of the virtual MAC address from the terminal is received, reads the virtual MAC address of the corresponding terminal from the address correspondence holding unit and sends back the virtual MAC address to the terminal; and a MAC address conversion unit which receives a first frame addressed to the virtual MAC address when the first frame is sent and received between the terminals, performs conversion of the virtual MAC address and real MAC address for the MAC address of the first frame, and sends back a converted second frame, wherein the terminal has a reply control unit that replies only to a reply frame from the relay device.

Furthermore, in order to achieve the above object, a further embodiment of the present invention is a path control method for a relay device in which a single or a plurality of layer-2 switches are connected in subordination to the same physical port and in which a single or a plurality of terminals are connected in subordination to the layer-2 switches, having the steps of: receiving a first ARP reply frame from the terminal; reading a virtual MAC address of the corresponding terminal on the basis of the received first ARP reply frame from an address correspondence holding unit that holds, for each of the terminals, an IP address and real MAC address of the terminal and a virtual MAC address being a MAC address that is virtual, and sending back the virtual MAC address to the terminal; and receiving a first frame addressed to the virtual MAC address when the first frame is sent and received between the terminals, performing conversion of the virtual MAC address and real MAC address with respect to the MAC address of the first frame, and sending back a converted second frame.

In addition, in order to achieve the above object, a further embodiment of the present invention is a path control program for a relay device in which a single or a plurality of layer-2 switches are connected in subordination to the same physical port and a single or a plurality of terminals are connected in subordination to the layer-2 switches, the path control program causing a computer to execute: processing to receive a first ARP reply frame from the terminal; processing to read a virtual MAC address of the corresponding terminal from an address correspondence holding unit that holds, for each of the terminals, an IP address and real MAC address of the terminal and the virtual MAC address being a MAC address that is virtual, and sending back the virtual MAC address to the terminal; and processing to receive a first frame addressed to the virtual MAC address when the first frame is sent and received between the terminals, perform conversion of the virtual MAC address and real MAC address with respect to the MAC address of the first frame, and send back a converted second frame.

With the present invention, it is possible to provide a relay device that implements security improvements including the collection of logs for the terminals in the floor LAN without changing the existing network configuration, and to provide a path control method and path control program.

BRIEF DESCRIPTION OF THE DRAWINGS

FIG. 5 is an example of a flowchart that is executed by the respective terminals;

FIG. 6A shows a constitutional example of an address correspondence holding section, FIG. 6B shows an example of a learning table of a layer-2 switch C (L2SW_C) and FIG. 6C shows an example of a learning table of a layer-2 switch D (L2SW_D);

FIG. 7A shows an example of an ARP table of terminal A and FIG. 7B shows an example of an ARP table of terminal B;

FIG. 8 shows another constitutional example of the security switch and so forth;

FIG. 9 is an example of another flowchart that is executed by a security switch;

FIG. 21 shows an example of a log;

FIG. 23 is an example of another flowchart that is executed by the security switch.

DESCRIPTION OF THE PREFERRED EMBODIMENTS

Preferred embodiments of the present invention will be described hereinbelow with reference to the drawings.

Figure 1:
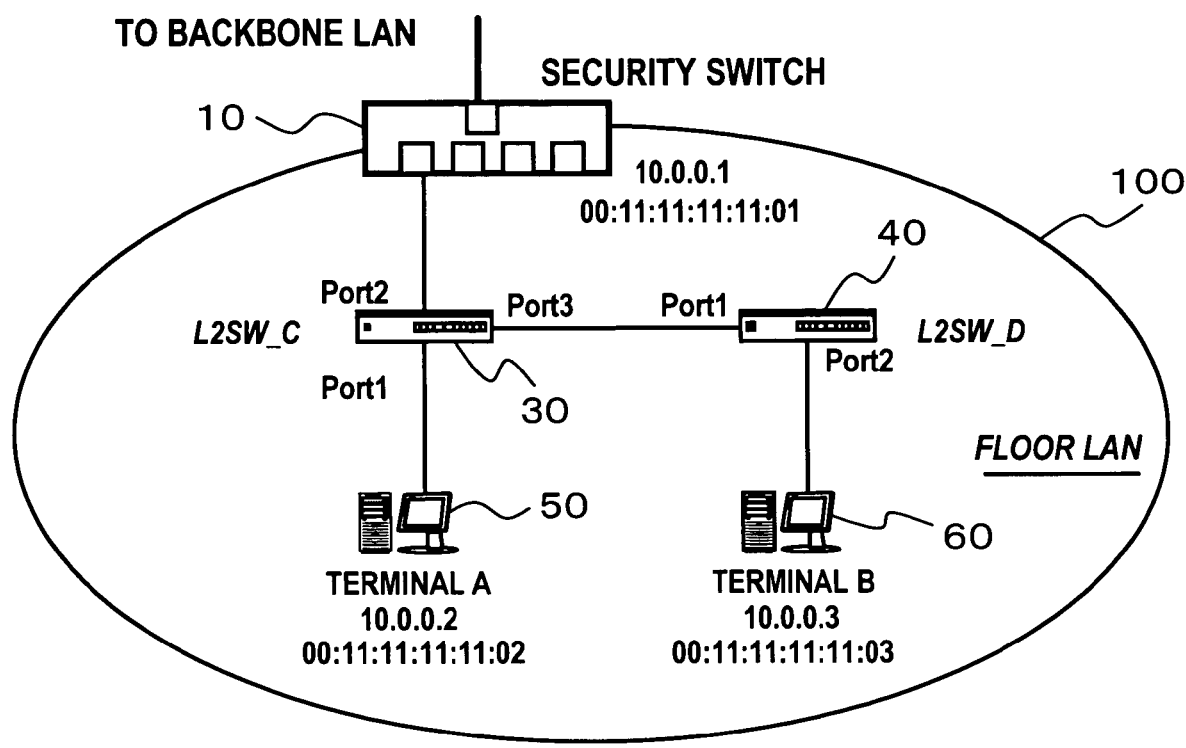
FIG. 1 shows a constitutional example of a network.

First, a first embodiment will be described. FIG. 1 shows a constitutional example of a network according to the first embodiment.

A security switch 10 is disposed between the floor LAN 100 and backbone LAN and a layer-2 switch C (L2SW-C) 30 is provided in subordination to the security switch 10. Further, a layer-2 switch D (L2SW_D) 40 is connected to the layer-2 switch C30. Client terminals A50 and B60 are connected to the layer-2 switches C30 and D40 respectively.

The IP address and MAC address of the respective devices are allocated as shown in FIG. 1.

Figure 2:
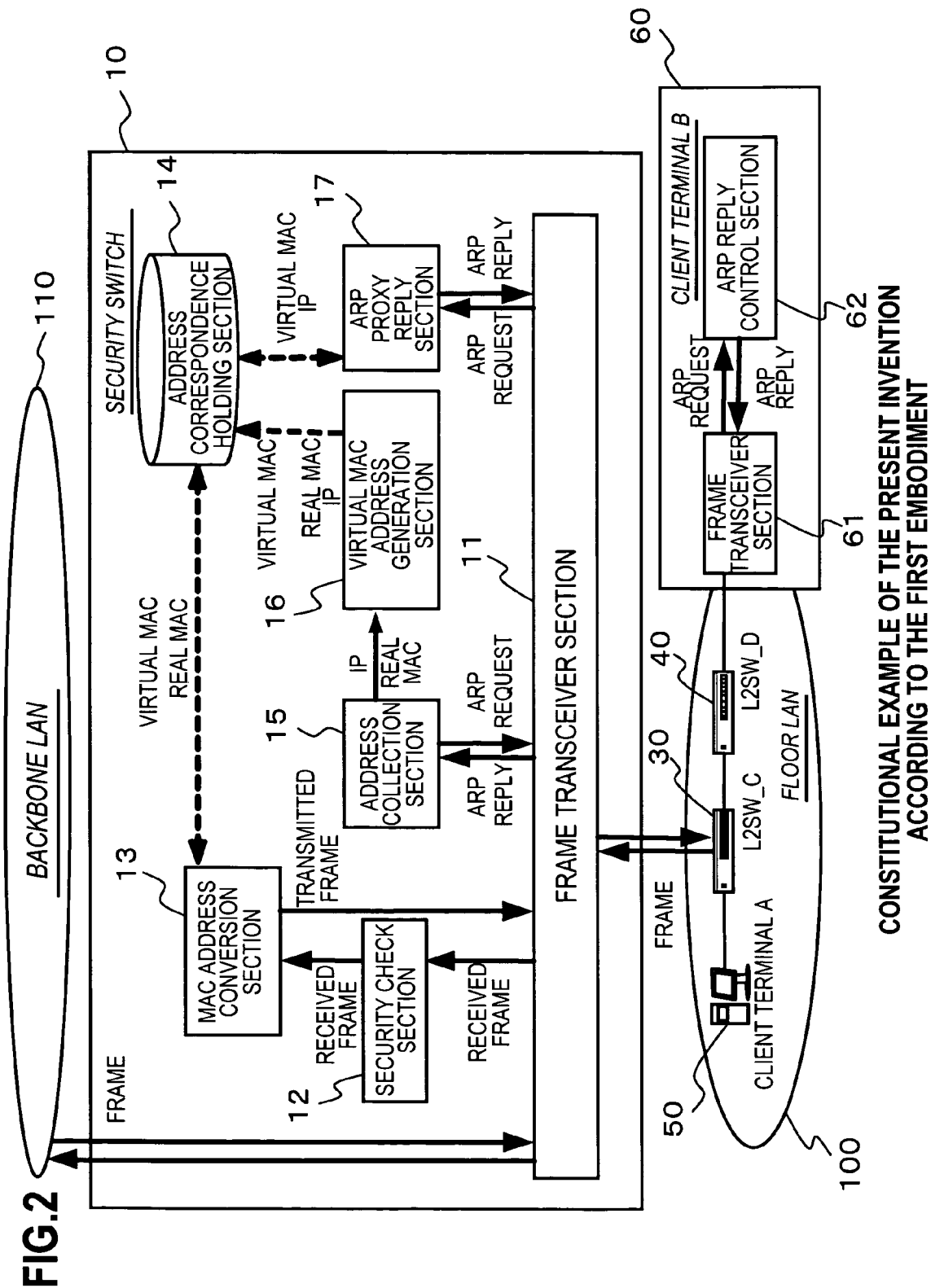
FIG. 2 shows a constitutional example of a security switch and so forth.

FIG. 2 shows a constitutional example of a security switch 10 and a client terminal B60. The security switch 10 comprises a frame transceiver section 11, a security check section 12, a MAC address conversion section 13, an address correspondence holding section 14, an address collection section 15, a virtual MAC address generation section 16, and an ARP proxy reply section 17.

The frame transceiver section 11 receives a variety of frames from the layer-2 switch C30. When a frame is an ARP reply frame, the frame transceiver section 11 outputs the frame to the address collection section 15. When a frame is an ARP request frame, the frame is output to the ARP proxy reply section 17. Other frames are output to the security check section 12 and, if necessary, to the required backbone LAN110.

Figure 3:
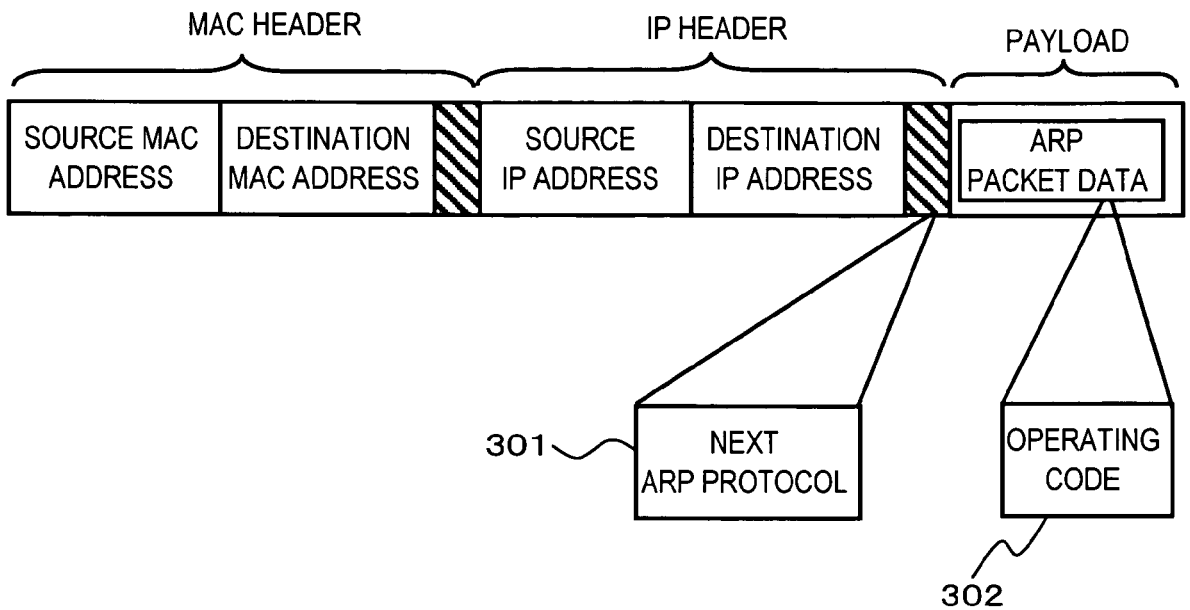
FIG. 3 shows a constitutional example of a MAC frame.

The discrimination of the types of such frames is performed as follows. That is, normally, a frame called a MAC frame is sent and received within the network shown in FIG. 1. FIG. 3 shows a constitutional example of such a MAC frame. The MAC frame has a field 301 that indicates whether 'ARP' protocol packet data are contained in the payload field. By confirming this field, the frame can be judged to be an ARP frame or another frame.

Further, the ARP packet data stored in the payload field has an operation code field 302 that indicates a 'reply' or 'request' and, by checking this field, the frame can be judged to be an ARP reply frame or an ARP request frame.

In addition, the frame transceiver section 11 outputs a transmission frame from the MAC address conversion section 13, an ARP request frame from the address collection section 15, and an ARP reply frame from the ARP proxy reply section 17 to the layer-2 switch C30.

The security check section 12 performs a security check on all the frames other than the received frame, that is, the ARP frame.

The security check checks whether an originally unused value such as "FF . . . " is contained in the source address of the MAC address in the frame, counts the number of received frames per hour, and performs a check depending on whether the count exceeds a threshold value (whether a so-called DoS attack has been performed). The security check section 12 performs processing such as discard processing, for example, on received frames that are not normal. Normal received frames are output to the downstream MAC address conversion section 13.

The MAC address conversion section 13 extracts the source MAC address and the destination MAC address from the received frame, searches the address correspondence holding section 14, and converts a virtual MAC address in the received frame to a real MAC address and a real MAC address to a virtual MAC address. The MAC address conversion section 13 outputs the converted frame to the frame transceiver section 11 as a transmission frame. The details including the virtual MAC address will be described subsequently.

The address correspondence holding section 14 holds a table in which an IP address, real MAC address, and virtual MAC address are one entry.

The address collection section 15 generates an ARP request frame at fixed intervals for each address in the subnet (10.0.0.0/24: that is, all devices in the floor LAN 100) to which the floor LAN 100 belongs in order to implement a timer interrupt or the like, for example and outputs the ARP request frame to the frame transceiver section 11. Further, the address collection section 15 extracts the IP address and real MAC address for the ARP reply frame from the frame transceiver section 11 and outputs the IP address and real MAC address to the virtual MAC address generation section 16.

The ARP reply frame from the frame transceiver section 11 is a reply frame for the ARP request frame and is transmitted from the respective terminals A50 and B60.

The virtual MAC address generation section 16 searches the address correspondence holding section 14 by taking the IP address and real MAC address from the address collection section 15 as the search key.

When this set of two addresses has not been registered in the address correspondence holding section 14, the virtual MAC address generation section 16 generates a virtual MAC address for the collected address (virtual MAC address) and stores a set of three addresses including this virtual MAC address in the address correspondence holding section 14 as one entry.

The ARP proxy reply section 17 searches the address correspondence holding section 14 by using the destination IP address as a key upon receiving an ARP request frame from the frame transceiver section 11.

If there is a corresponding IP address, the virtual MAC address in the entry is read and an ARP reply frame in which the source MAC address is a virtual MAC address is generated and output to the frame transceiver section 11.

The ARP request frame from the frame transceiver section 11 is a frame that is transmitted in order to obtain a virtual MAC address from the respective terminal A50 and B60 and, by storing a virtual MAC address in the reply frame (ARP reply frame), each of the terminals A50 and B60 is able to acquire a virtual MAC address.

The client terminal B60 comprises a terminal-side frame transceiver section 61 and an ARP reply control section 62.

The terminal-side frame transceiver section 61 receives frames from the floor LAN 100 and, upon receipt of a self-addressed ARP request, outputs the frames to the ARP reply control section 62. If the ARP request is not addressed to itself, the terminal-side frame transceiver section 61 receives an ARP reply frame from the ARP reply control section 62 and transmits the frame to the floor LAN 100.

Upon receipt of an ARP request frame, the ARP reply control section 62 generates an ARP reply frame only when the source IP address is the IP address ('10.0.0.1') of the security switch 10 and outputs the ARP reply frame to the terminal-side frame transceiver section 61. When the transmission source is not the ARP request frame from the security switch 10, the ARP reply control section 62 discards the frame. The MAC address of the security switch 10 ('00:11:11:11:11:01') may also be checked instead of the IP address.

Furthermore, the client terminal B60 comprises an ARP table. Each time an ARP reply frame is received from terminal A50 by the ARP reply control section 62, an entry which is a set of the MAC address of terminal A50 (virtual MAC address or real MAC address) and the IP address of terminal A50 is added to the ARP table.

Terminal B60 is able to send and receive frames by using the virtual MAC address of terminal A50 on the basis of the ARP table.

Further, the client terminal A50 also similarly comprises a terminal-side frame transceiver section and an ARP reply control section.

In addition, the layer-2 switch C30 and the layer-2 switch D40 comprise a learning table which is a set of a MAC address (virtual MAC address or real MAC address) and an output port. In the layer-2 switches C30 and D40, entries of the learning table are added from the source MAC address and the connection port destination for frames that are input.

Figure 4:
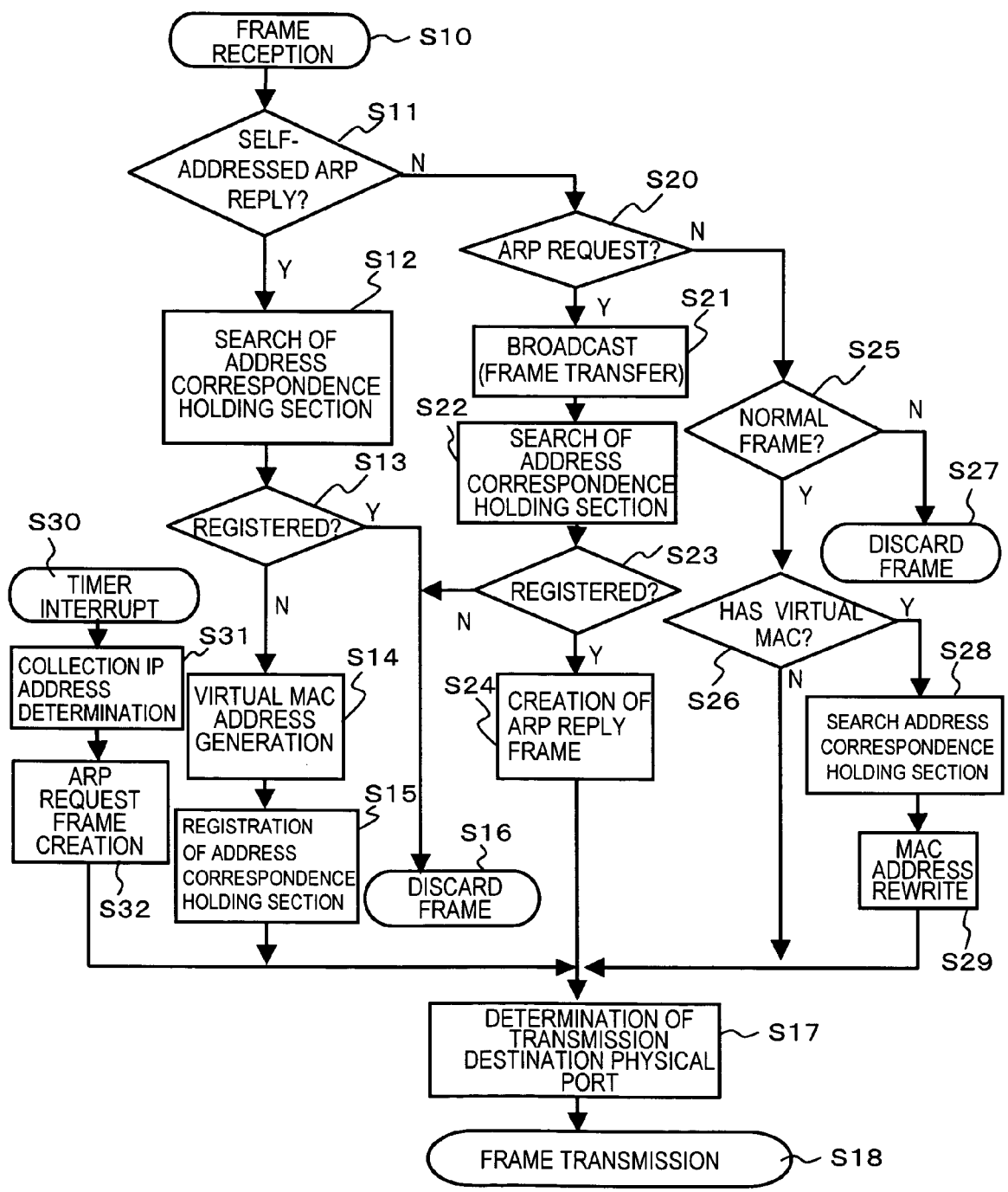
FIG. 4 is an example of a flowchart that is executed by a security switch.

The operation of the security switch 10 and so forth constituted in this manner will be described hereinbelow. FIG. 4 is an example of a flowchart of a security switch 10 and FIG. 5 is an example of a flowchart of terminals A50 and B60.

In the examples shown hereinbelow, a case where communication is made from terminal A50 to terminal B60 was described. Entries are not registered in the ARP table of terminals A50 and B60 or in the learning table of layer-2 switches C30 and D40.

The overall operation is divided into three phases, namely, (1) the collection of addresses by the security switch 10 (the generation of virtual MAC addresses), (2) the address resolution of terminal A50 with respect to terminal B60 (acquisition of generated virtual MAC addresses), and (3) the transmission of frames by terminal A50 to terminal B60 (the transmission of frames on the basis of an acquired virtual MAC address). Each of these phases will be described hereinbelow.

(Phase 1) Collection of Addresses by the Security Switch 10

First, the address collection section 15 of the security switch 10 determines the IP address of the collection destination (S31) for the sake of timer interruption (S30). Here, the IP address of terminal A50 is the target.

Further, the address collection section 15 generates an ARP request frame for terminal A50 (S32). The ARP request frame renders the source MAC address '00:11:11:11:11:01' (MAC address of security switch 10), renders the source IP address '10.0.0.1.' (IP address of security switch 10), renders the destination MAC address 'FF:FF:FF:FF:FF:FF' (broadcast transmission), and renders the destination IP address '10.0.0.2' (IP address of terminal A50). The address collection section 15 outputs the ARP request frame thus generated to the frame transceiver section 11.

The frame transceiver section 11 transmits the ARP request frame to the floor LAN 100.

Upon receiving the frame, the layer-2 switch C30 registers the MAC address (MAC address '00:11:11:11:11:01' of the security switch 10 constituting the transmission source) and the connection port ('Port 2' as shown in FIG. 1) in the learning table. In addition, because the destination MAC address of the frame is a broadcast address, layer-2 switch C30 transmits the frame to all the ports ('Port 1' and 'Port3' of layer-2 switch C30).

Upon receipt of the ARP request frame, the layer-2 switch D40 registers the MAC address (MAC address '00:11:11:11:11:01' of the security switch 10 constituting the transmission source) and the connection port ('Port 1' of the layer-2 switch D40) in the learning table. Furthermore, because the destination MAC address of the frame is a broadcast address, the layer-2 switch D40 transmits the frame to all the ports ('Port2' of layer-2 switch).

When terminal B60 (terminal-side frame transceiver section 61 of terminal B60) receives the ARP frame (S40 of FIG. 5), because the destination IP address is the IP address of the terminal A50 and this is not an ARP request frame addressed to its own IP address ('N' in S41), terminal B60 discards the frame (S47).

On the other hand, when terminal A50 receives the ARP frame (S40), because this is an ARP request frame addressed to its own IP address ('Y' in S41 and 'N' in S42), the terminal-side frame transceiver section transfers the frame to the ARP reply control section.

Because the transmission source of the frame is the security switch 10 ('Y' in S44), the ARP reply control section generates an ARP reply frame (S45). The terminal-side frame transceiver section then transmits the frame to the ARP reply control section (S46).

The ARP reply frame is a frame that renders the source MAC address '00:11:11:11:11:02' (IP address of terminal A50), renders the source IP address '10.0.0.2' (IP address of terminal A50), renders the destination MAC address '00:11:11:11:11:01' (MAC address of security switch 10), and renders the destination IP address '10.0.0.1' (IP address of security switch 10).

The layer-2 switch C30 that has received the ARP reply frame registers the MAC address (MAC address '00:11:11:11:11:02' of terminal A50 which is the transmission source) and the connection port ('Port 1') from the frame in the learning table. The layer-2 switch C30 transmits the frame to the connecting port ('Port2') of the destination MAC address (MAC address of security switch 10).

Upon receipt of the frame (S10), the frame transceiver section 11 of the security switch 10 judges whether the frame is a self-addressed ARP reply frame (S11). In this case, because the frame is an ARP reply frame addressed to itself ('Y' in S11), the frame transceiver section 11 outputs the frame to the address collection section 15.

The address collection section 15 outputs the source IP address of the ARP reply frame (IP address '10.0.0.2' of terminal A50) and the source MAC address (MAC address '00:11:11:11:11:02' of terminal A50) to the virtual MAC address generation section 16.

The virtual MAC address generation section 16 searches the address correspondence holding section 14 by using the source IP address and source MAC address (or either one) as the search key (S12) and judges whether registration is complete (S13).

In this case, because an applicable entry cannot be found ('N' in S13), the virtual MAC address generation section 16 generates a virtual MAC address (S14).

The virtual MAC address is generated on the basis of a real MAC address (in this case, the MAC address '00:11:11:11:11:02' of terminal A50 which is the transmission source). As a rule for generating a virtual MAC address, the G/L (Global/Local) bit (second lower-order bit of first octet of MAC address) of the MAC header of the ARP reply frame (MAC frame) is '1', for example.

In this example, since the first object '00' of the MAC address is a 'hexadecimal', when corrected to a 'binary' value, it becomes '0000 0000' and, supposing that the lower-order second bit is '1', it is then '0000 0010'. When this is corrected to the original 'hexadecimal', the first octet changes from '00' to '02' and the virtual MAC address is then '02:11:11:11:11:02'.

Naturally, the virtual MAC address may be generated by using values that are not ordinarily used.

As a result, when the G/L bit of the MAC address is '1', the security switch 10 is able to judge that all bits are a virtual MAC address.

The virtual MAC address generation section 16 registers the generated virtual MAC address (virtual MAC address '02:11:11:11:11:02' of terminal A50), the IP address (IP address '10.0.0.2' of terminal A50), and the real MAC address (MAC address '00:11:11:11:11:02' of terminal A50) in the address correspondence holding section 14 as one entry (S15).

As a result of the same procedure as that above, the security switch 10 registers a virtual MAC address ('02:11:11:11:11:03') of terminal B60, an IP address ('10.0.0.3'), and a real MAC address ('00:11:11:11:11:03') in the address correspondence holding section 14.

The example of the table registered in the address correspondence holding section 14 is shown in FIG. 6A.

(Phase 2) Address Resolution for Terminal B60 of Terminal A50

Thereafter, the phase in which terminal A50 performs address resolution for terminal B60 (acquisition of generated virtual MAC address) will be described.

First, terminal A50 transmits an ARP request frame to the security switch 10. The source MAC address of the ARP request frame is '00:11:11:11:11:02' (MAC address of terminal A50), the source IP address is '10.0.0.2' (IP address of terminal A50), the destination MAC address is 'FF:FF:FF:FF:FF:FF' (broadcast address) and the destination IP address is '10.0.0.3' (IP address of terminal B60).

When the layer-2 switch C30 receives the ARP request frame, because the destination MAC address represents a broadcast address, the layer-2 switch C30 transmits the frame to all the ports.

When the layer-2 switch D40 receives an ARP request frame, a source MAC address (MAC address '00:11:11:11:11:02' of terminal A50) and connection port ('Port 1') are registered in the learning table. Further, the layer-2 switch D40 transmits the frame to all the ports because the destination MAC address is a broadcast address.

Upon receipt of the ARP request frame (S40), terminal B60 outputs the frame to the ARP reply control section 62 ('Y' in S41, 'Y' in S42). The terminal-side frame transceiver section 61 judges whether the received frame is an ARP request frame (S42) but this is judged from the respective fields 301 and 302 in the frame (See FIG. 3) in the same way as the frame transceiver section 11 of the security switch 10.

Because the source IP address is the address of terminal A50 ('N' in S44), the ARP reply control section 62 discards the frame (S47) and does not create a reply frame.

In the first embodiment, the respective terminals A50 and B60 have a function that creates a reply frame (ARP reply frame) only when an ARP request frame of which the transmission source is the security switch 10 is received and which, when a frame other than this frame is received, discards the received frame.

On the other hand, when the ARP request frame from terminal A50 is received (S10, 'N' in S11 and 'Y' in S20), the frame transceiver section 11 of the security switch 10 transfers the frame to the ARP proxy reply section 17 (S21).

The ARP proxy reply section 17 searches the address correspondence holding section 14 for the destination IP address of the ARP request frame (IP address '10,0,0,3' of terminal B60) as the search key (S22). In this example, the entry concerned has been registered in (Phase 1) ('Y' in S23). Further, when the entry has not been registered ('N' in S23), because the virtual MAC address is not generated in (Phase 1), the received ARP request frame is discarded (S16).

The ARP proxy reply section 17 acquires a corresponding virtual MAC address (virtual MAC address '02:11:11:11:11:03' of terminal B60) from the address correspondence holding section 14 and then creates an ARP reply frame for the ARP request frame (S24).

The source MAC address of the ARP reply frame is '02:11:11:11:11:03' (virtual MAC address of terminal B60), the source IP address is '10.0.0.3' (IP address of terminal B60), the destination MAC address is '00:11:11:11:11:02' (MAC address of terminal A50), and the destination IP address is '10.0.0.2' (IP address of terminal A50).

The transmission destination physical port is determined (S17) and the ARP reply frame thus generated is transmitted from this port to the floor LAN 100 (S18).

Upon receiving the ARP reply frame, the layer-2 switch C30 registers the source MAC address (virtual MAC address of terminal B60 '02:11:11:11:11:03') and the connection port ('Port2') in the learning table. Further, the layer-2 switch C30 references the learning table and transmits the frame to the port ('Port2') to which the destination MAC address (the MAC address of terminal A50 '00:11:11:11:11:02') is connected.

Terminal A50 receives the ARP reply frame and acquires the virtual MAC address ('02:11:11:11:11:03') of terminal B60 (S40, 'Y' in S41, 'N' in S42, and S43).

Further, terminal B60 is also able to transmit the ARP request frame to the security switch 10 and acquire the virtual MAC address of terminal A50 from the ARP reply frame which is the reply frame.

(Phase 3) Terminal A50 Transmits Frame to Terminal B60

Thereafter, a phase in which terminal A50 transmits the frame to terminal B60 on the basis of the acquired virtual MAC address will be described.

Terminal A50 transmits the frame to terminal B60. The source MAC address of the frame is '00:11:11:11:11:02' (MAC address of terminal A50)), the source IP address is '10.0.0.2' (IP address of terminal A50), the destination MAC address is '02:11:11:11:11:03' (virtual MAC address of terminal B60), and the destination IP address is '10.0.0.3' (IP address of terminal B60).

Upon receipt of the frame, the layer-2 switch C30 references the learning table and transmits the frame to the port ('Port2') to which the destination MAC address (virtual MAC address '02:11:11:11:11:03' of terminal B60) is connected. The entry is created in phase 2.

When the frame transceiver section 11 of the security switch 10 receives the frame (S10, 'N' in S20), the frame transceiver section 11 outputs the frame to the security check section 12.

The security check section 12 checks the security of the received frame (S25) and outputs the frame to the MAC address conversion section 13 ('Y' in S25).

Further, the security check section 12 discards the frame when a problem occurs as a result of checking the security of the received frame (S27). This serves to prevent infection of the devices in the floor LAN 100 because a worm or Dos infection or the like has occurred.

Furthermore, the security check section 12 may display information indicating that a problem has occurred on the display section instead of discarding the frame and perform processing to obtain a log or the like.

The MAC address conversion section 13 searches the address correspondence holding section 14 by using the source MAC address (MAC address '00:11:11:11:11:02' of terminal A50) as the search key and obtains the virtual MAC address (virtual MAC address '02:11:11:11:11:02' of terminal A50, generated in Phase 1) ('Y' in S26, S28).

Further, the MAC address conversion section 13 rewrites the source MAC address of the received frame with the acquired virtual MAC address (S29).

In addition, the MAC address conversion section 13 searches the address correspondence holding section 14 by using the destination MAC address in the received frame (the virtual MAC address '02:11:11:11:11:03' of terminal B60) as the search key (S28) and acquires the real MAC address (real MAC address '00:11:11:11:11:03' of terminal B60). The MAC address conversion section 13 then rewrites the destination MAC address of the received frame (virtual MAC address) with the acquired real MAC address (S29).

That is, in the rewritten frame, the source MAC address is '02:11:11:11:11:02' (virtual MAC address of terminal A50), the source IP address is '10.0.0.2' (IP address of terminal A50), the destination MAC address is '00:11:11:11:11:03' (real MAC address of terminal B60), the destination IP address is '10.0.0.3' (IP address of terminal B60).

The MAC address conversion section 13 outputs the rewritten frame to the frame transceiver section 11 and the frame transceiver section 11 transmits the frame to the floor LAN 100 (S17, S18).

Upon receipt of the transmitted frame, the layer-2 switch C30 registers the source MAC address '02:11:11:11:11:02' (virtual MAC address of terminal A50), and the connection port ('Port1') in the learning table and transmits the frame to the port ('Port2') to which the destination MAC address ('00:11:11:11:11:03') is connected.

Further, terminal B60 receives the transmitted frame (S40, 'Y' in S41, 'N' in S42, S43).

Further, the transmission of the frame from terminal B60 to terminal A50 can also be implemented in the same way by means of this phase 3 and procedure.

After the transmission and reception of the frame between terminals A50 and B60 is complete, examples of the learning tables of the respective layer-2 switches C30 and D40 are shown in FIGS. 6B and 6C and the examples of the ARP tables of the respective terminals A50 and B60 are shown in FIGS. 7A and 7B.

Thus, in the first embodiment, when the frame is transmitted from terminal A50 to terminal B60, because the frame is transferred from layer-2 switch C30 to security switch 10 by using the virtual MAC address, the frame can be passed through the security check section 12. Hence, the security switch 10 that implements an increase in security can be provided for terminals A50 and B60 in floor LAN 100.

Further, the above functions are implemented without changing the overall network configuration also in comparison with FIG. 20A.

In addition, because there is also no need to add the security check section 12 to the layer-2 switches C30 and D40, there are no cost increases incurred and maintenance time for replacing switches need not be increased.

Second Embodiment

The second embodiment will be described next. The second embodiment is an example in which a virtual MAC address is created without using an ARP request frame and ARP reply frame in order to increase the security.

FIG. 8 is a constitutional example of a security switch 10 of the second embodiment. In comparison with the first embodiment, a server 120 (IP address is '20.0.0.1') is installed in the backbone LAN 110. Further, default gateway 130 (the MAC address is '00:11:11:11:11:10') is installed between the security switch 10 and the backbone LAN 110. Other network configuration examples are substantially the same as that of the first embodiment.

Furthermore, the constitutions of terminal A50 and B60 are the same as those of the first embodiment and the constitution of the security switch 10 is also substantially the same as that of the first embodiment.

However, the address collection section 15 of the security switch 10 differs from the first embodiment and the source IP address and the source MAC address are extracted from the header information of the frame received from the floor LAN 100 and output to the virtual MAC address generation section 16.

The processing after the virtual MAC address has been generated is the same as that of the first embodiment and phase 1 (address collection phase by the security switch 10) will be described in the following description.

Furthermore, in order to simplify the description, an example in which terminal A50 transmits a frame to the server 120 of the backbone LAN 110 and a virtual MAC address is generated through address collection by the security switch 10 will be described. Further, MAC address '00:11:11:11:11:10' (the real MAC address of gateway 130) and the connection port ('Port2') is already registered in the learning table of layer-2 switch C30. FIG. 9 shows an example of a flowchart of the security switch 10 of the second embodiment. The same numerals have been assigned to the same processing as the example shown in FIG. 4.

(Phase 1) Address Collection by the Security Switch 10

Terminal A50 generates the frame that is to be transmitted to server 120. The source MAC address of the frame is '00:11:11:11:11:02' (MAC address of terminal A50), the source IP address is '10.0.0.2' (the IP address of terminal A50), the destination IP address is '20.0.0.2' (the IP address of the server 120), and the destination MAC address is '00:11:11:11:11:10' (the MAC address of the gateway 130).

Upon receipt of the frame, the layer-2 switch C30 references the learning table and transmits the frame to the port ('Port2') to which the destination MAC address ('00:11:11:11:11:10') is connected.

When the frame transceiver section 11 of the security switch 10 receives the frame (S10), the frame transceiver section 11 transfers the frame to the backbone LAN 110. Further, because the frame is the received frame from the floor LAN 100, the frame is also duplicated and transferred to the address collection section 15.

The address collection section 15 outputs the source IP address of the received frame (the IP address '10.0.0.2' of terminal A50 and the source MAC address (the MAC address '00:11:11:11:11:02' of terminal A50) to the virtual MAC address generation section 16.

The virtual MAC address generation section 16 searches the address correspondence holding section 14 by using the source IP address and the source MAC address (or either one) as the search key (S50). In this example, because the virtual MAC address of terminal A50 has not been registered ('N' in S51), the virtual MAC address is generated (S52).

The virtual MAC address generation section 16 generates a virtual MAC address (virtual MAC address '02:11:11:11:11:02' of terminal A50) on the basis of the real MAC address in the same way as in the first embodiment. Further, the virtual MAC address, IP address ('10.0.0.2') and real MAC address ('00:11:11:11:11:02') are registered in the address correspondence holding section 14 (S53).

As described hereinabove, the security switch 10 is able to collect addresses on the basis of the received frame from the floor LAN 100 and generate the virtual MAC addresses of the respective terminals A50 and B60 in the floor LAN 100. The subsequent processing is the same as that of the first embodiment.

Thereupon, in comparison with the first embodiment, because the transmission and receipt of the ARP frames (both the reply and request frames) are not performed, the amount of data transferred into the floor LAN 100 can be proportionately reduced and the effective utilization of the network resources can be achieved.

Furthermore, in the subsequent processing, terminal A50 is able to transmit the ARP request frame to the security switch 10 and, by receiving the reply frame, terminal A50 is able to acquire the virtual MAC address of terminal B60 (phase 2)

In addition, by transmitting the frame by using the virtual MAC address, the frame can be transferred to the security switch 10 (phase 3). Hence, also in the second embodiment, as with the first embodiment, the security switch 10 that improves the security without changing the network configuration can be provided.

Third Embodiment

The third embodiment will be described next. The third embodiment is an example in which, in communication that is in subordination to the same physical port of the security switch 10, communication is made to pass through the security switch 10 by using the same virtual MAC address as in the first embodiment and so forth and, in communication that in subordination to other physical ports, communication is made to pass through the security switch 10 without performing such processing.

Figure 10:
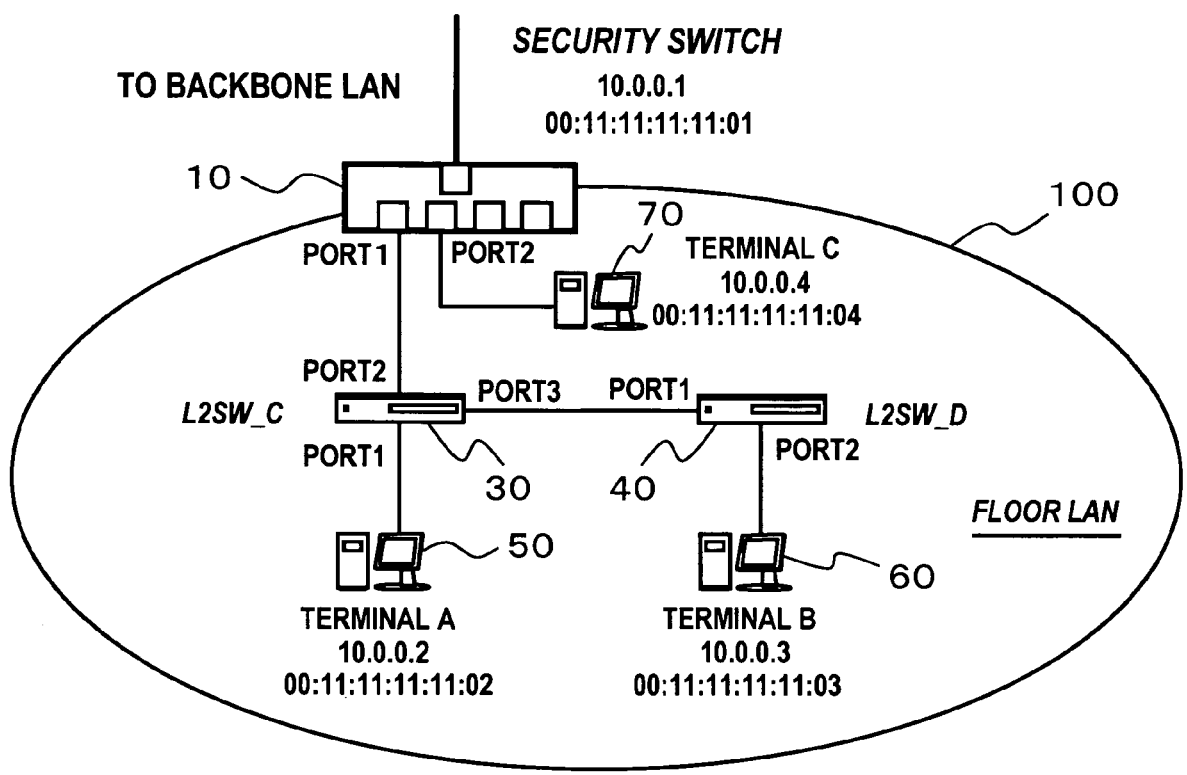
FIG. 10 shows another constitutional example of a network.

FIG. 10 shows a constitutional example of the network according to the third embodiment. The same numerals have been assigned to the same parts as those of the first embodiment and so forth. A terminal C70 is connected to a different physical port of the security switch 10 ('Port2', for example).

Figure 11:
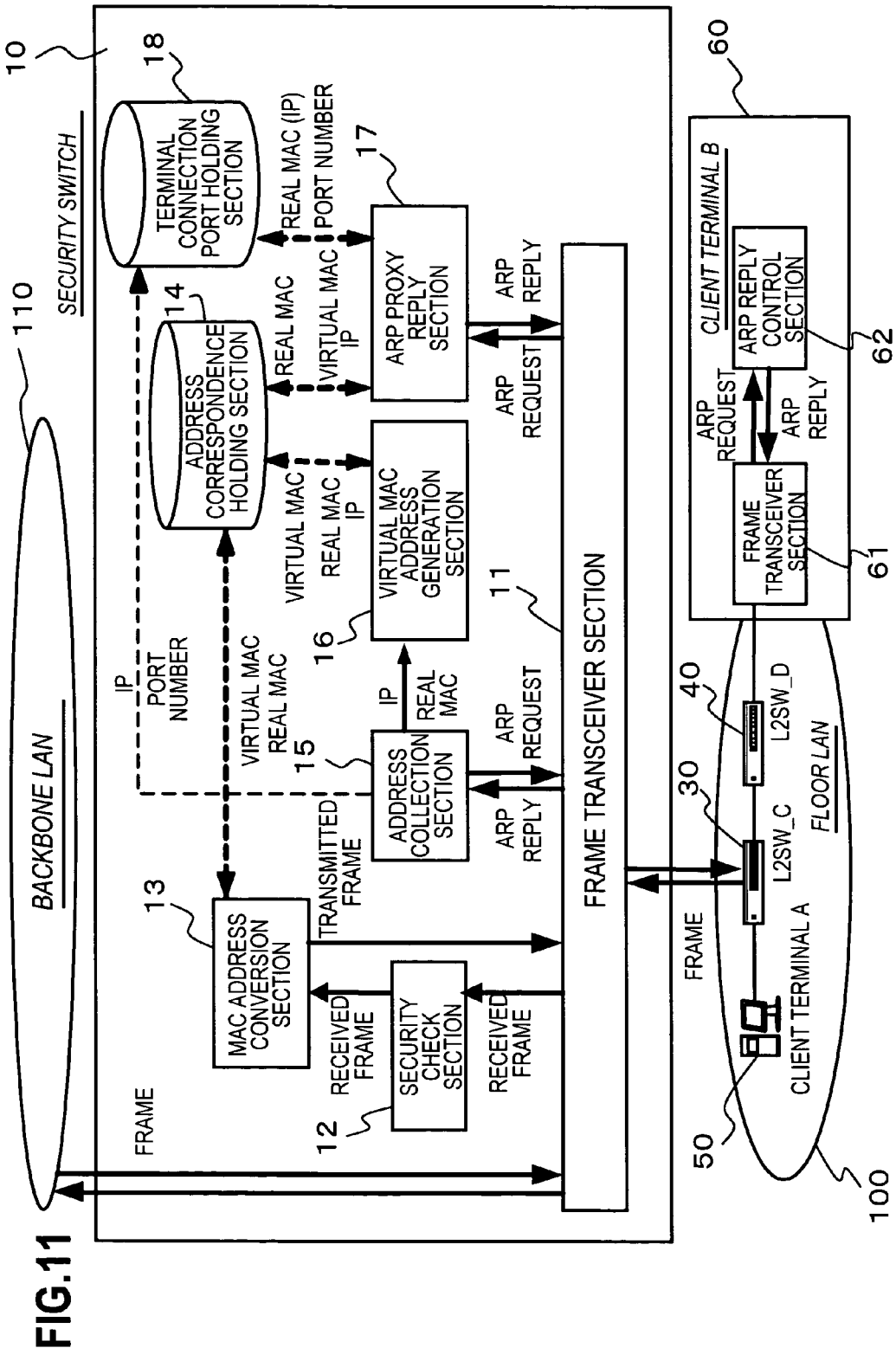
FIG. 11 shows another constitutional example of the security switch and so forth.

FIG. 11 is a constitutional example of the security switch 10 and so forth. The constitution of the security switch is substantially the same as that of the first embodiment but for the addition of a terminal connection port holding section 18.

The terminal connection port holding section 18 holds the real MAC address of the terminal and physical port information of the connection destination.

Further, when the address collection section 15 receives an ARP reply frame from the frame transceiver section 11, the address collection section 15 registers the reception physical port number of the frame and the source MAC address in the terminal connection port holding section 18. The other functions are the same as those of the first embodiment.

In addition, the ARP proxy reply section 17 receives a reception port number together with the ARP request frame from the frame transceiver section 11. The ARP proxy reply section 17 searches the address correspondence holding section 14 by using the destination IP address as the search key. Further, the terminal connection port holding section 18 is searched by using the real MAC address thus obtained as the search key and the physical port number is obtained. It is judged whether subordination is to the same physical port as the reception port by comparing the obtained physical port number and the port number from the frame transceiver section 11. Based on the judgment result, a virtual MAC address is sent back when the port is the same as the reception port and a real MAC address is sent back when the port is another port.

Further, the frame transceiver section 11 outputs the reception physical port number to the address collection section 15 and ARP proxy reply section 17. For example, information indicating the physical port number is stored in the memory, for example, and, when a frame is received by a certain physical port, this information is output together with the frame.

Figure 12:
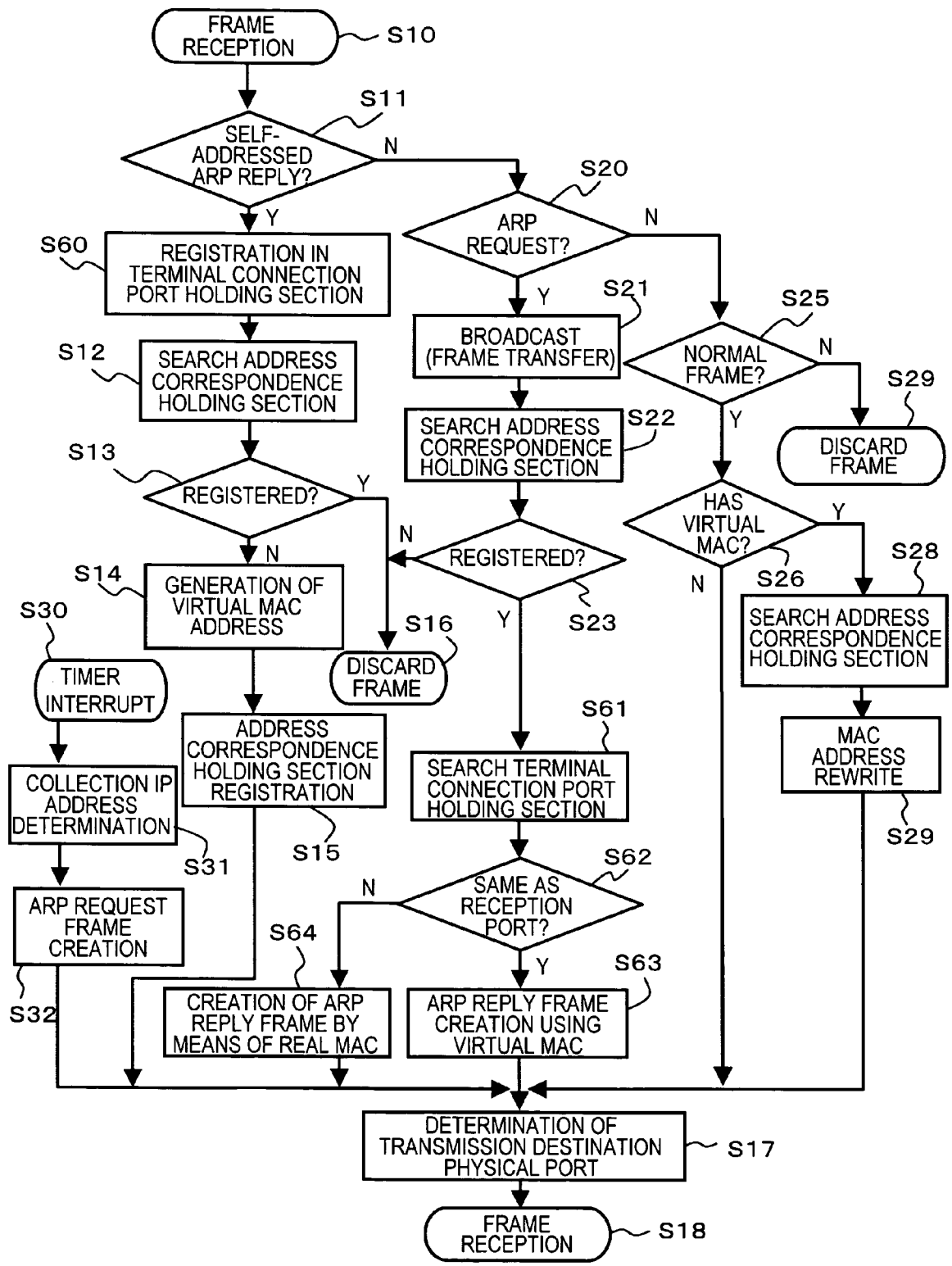
FIG. 12 is an example of another flowchart that is executed by the security switch.

The operation will be described as follows. FIG. 12 shows an example of a flowchart of a security switch 10 of the third embodiment. The same numerals have been assigned to the same processing as that of the first embodiment (FIG. 4). In addition, the processing of the respective terminals A50 is as per the flowchart in FIG. 5 as in the case of the first embodiment. Each of the phases of phases 1 to 3 will now be described as per the first embodiment.

(Phase 1) Address Collection by Security Switch 10

The processing is the same as that of the first embodiment up until a ARP request frame is generated by the address collection section 15 of the security switch 10 and terminal A50 transmits an ARP reply frame in response to this frame.

Thereupon, the learning tables generated by the layer-2 switches C30 and D40 are also the same and the fact that the ARP request frame received by the terminal B60 is discarded and a reply is not made is also the same as in the first embodiment.

When the frame transceiver section 11 of the security switch 10 receives the ARP reply frame (S10 of FIG. 12), because the ARP reply frame is a reply frame addressed to itself ('Y' in S11), the ARP reply frame and the reception physical port number ('Port1') is output to the address collection section 15.

The address collection section 15 outputs the source IP address of the ARP reply frame (the IP address of terminal A50 is '10.0.0.2') and outputs the source MAC address ('00:11:11:11:11:02') to the virtual MAC address generation section 16.

Furthermore, the address collection section 15 outputs the source MAC address and reception physical port number ('Port1') to the terminal connection port holding section 18 and the information is saved (S60).

Because the virtual MAC address generation section 16 searches the address correspondence holding section 14 by using the source IP and MAC address (or either one) as the search key but a relevant entry is not found (S12, 'N' in S13), the virtual MAC address generation section 16 generates a virtual MAC address (S14).

The virtual MAC address generation section 16 generates a virtual MAC address (virtual MAC address '02:11:11:11:11:02' of terminal A50) on the basis of a real MAC address. The rule for generation is the same as that of the first embodiment. The generated virtual MAC address is registered in the address correspondence holding section 14 together with the real MAC address and IP address (S15).

As mentioned earlier, the virtual MAC address is registered and the entry of terminal A50 (MAC address '00:11:11:11:11:02', port number 'Port1') are registered in the terminal connection port holding section 18.

By means of the same procedure as that described above, the entry of terminal B60 (MAC address '00:11:11:11:11:03', port number 'Port1'), and the entry of terminal C70 (MAC address '00:11:11:11:11:04' and port number 'Port2') are also registered in the terminal connection port holding section 18.

(Phase 2) Address Resolution of Terminal A50 with Respect to Terminal B60

The transmission by terminal A50 of an ARP request frame by means of a broadcast is the same as that of the first embodiment. The difference is the processing by the security switch 10 that receives the frame (S61 to S63).

That is, upon receipt of the ARP request frame (S10), the frame transceiver section 11 of the security switch 10 outputs the frame and the reception physical port number ('Port1') to the ARP proxy reply section 17 ('N' in S11 and 'Y' in S20, S21).

The ARP proxy reply section 17 searches the address correspondence holding section 14 by means of the destination IP address of the ARP request frame (IP address '10.0.0.3' of terminal B60) (S22) and acquires the relevant real MAC address '00:11:11:11:11:03' and the virtual MAC address '02:11:11:11:11:03' ('Y' in S23).

The ARP proxy reply section 17 searches the terminal connection port holding section 18 by using the real MAC address thus obtained as the search key (S61) and acquires the port number 'Port1'. The port number is the same as the reception physical port number 'Port1' from the frame transceiver section 11 ('Y' in S62).

That is, the reception port (reception physical port number) and the port transmitted to the destination (port number) are the same. It can therefore be judged that communication is performed in subordination to the same physical port. Accordingly, processing that is the same as that of the first embodiment, that is, processing that uses a virtual MAC address (processing following S63) is performed.

In this example, the ARP proxy reply section 17 creates an ARP reply frame (S63) and transmits the frame to 'Port1' (S17). Terminal A50 acquires the virtual MAC address of terminal B60.

(Phase 2-1) Address Resolution from Terminal A50 to Terminal C70

As the next example, the address resolution from terminal A50 to terminal C70 will be described.

First, terminal A50 transmits the ARP request frame by means of a broadcast. The MAC address and IP address of the transmission source of the ARP request frame is the address of terminal A ('00:11:11:11:11:02' and '10.0.0.2' respectively), the destination MAC address is the broadcast address 'FF:FF:FF:FF:FF:FF', the destination IP address is the address '10.0.0.4' of terminal C70.

When the layer-2 switches C30 and D40 receive the ARP request frame, because the ARP request frame is a broadcast address, the layer-2 switches C30 and D40 transmit the frame to all the ports.

Because the ARP request frame is not addressed to terminal B60, terminal B60 discards the ARP request frame ('N' in S41, S47).

When the frame transceiver section 11 of the security switch 10 receives the ARP request frame (S10), because the ARP request frame is a broadcast address, the frame transceiver section 11 transmits the frame to 'Port2'. Further, the frame transceiver section 11 outputs the reception physical port number 'Port1', the ARP request frame to the ARP proxy reply section 17 ('N' in S11 and 'Y' in S20, S21).

The ARP proxy reply section 17 searches the address correspondence holding section 14 by means of the destination IP address '10.0.0.4' of the ARP request frame and acquires the relevant real MAC address '00:11:11:11:11:04' and the virtual MAC address '02:11:11:11:11:04' (S22, 'Y' in S23).

The ARP proxy reply section 17 then searches the terminal connection port holding section 18 by using the real MAC address thus obtained as the search key (S61) and acquires the port number 'Port2'. This number is a different number from the reception path port number 'Port1' ('N' in S62) and therefore an ARP reply frame is created by means of a real MAC address (S64).

The created ARP reply frame is a frame in which the transmission source is the address of terminal C70 ('00:11:11:11:11:04', IP address '10.0.0.4' of the real MAC address), and the destination is the address of terminal A50 (MAC address '00:11:11:11:11:02' and IP address '10.0.0.2'). The source MAC address is not the virtual MAC address and uses the real MAC address.

The frame transceiver section 11 outputs the ARP reply frame to 'Port1'.

Upon receipt of the ARP reply frame, the layer-2 switch C30 references the learning table and transmits the frame to port 'Port1' to which the destination MAC address '00:11:11:11:11:02' is connected.

Terminal A50 receives the ARP reply frame (S40) and acquires the real MAC address of terminal C70. Thereafter, terminal A50 communicates with terminal C70 by using the real MAC address. Thereupon, communication is made from terminal A50 to terminal C70 via the security switch 10 by means of a normal layer-2 relay. Therefore, the security can be increased because the transmitted frame passes through the security check section 12 of the security switch 10.

By performing processing in the same way from terminal C70 to terminal A50, terminal C70 acquires the real MAC address of terminal A50 and communicates by using the address. In this case also, the frame is sent and received via the security switch 10. Furthermore, the processing can be performed in exactly the same way between terminals B60 and C70.

As mentioned earlier, in the third embodiment, in the case of communication that is in subordination to the same physical port, processing that uses the same virtual MAC address as that of the first embodiment is performed, whereas, in the case of communication that is in subordination to different physical ports, a normal layer 2 relay is executed without performing the processing of the first embodiment. Hence, in either case, because the frame passes through the security check section 12, the network configuration cannot be changed and security improvements can be made. The other operating results of the first embodiment can be accomplished in the third embodiment.

In the third embodiment, the fact that the real MAC address is registered in the terminal connection port holding section 18 was described. However, the IP address of the respective terminals A50 and port information may be registered, for example. This may be an identifier that makes it possible to identify the respective terminals A50.

Fourth Embodiment

The fourth embodiment will be described next.

In each of the embodiments above, the fact that the reply frame (ARP reply frame) is transmitted to terminal A50 only in the event of an ARP request frame from the security switch 10 was also described (S41 to S45 in FIG. 4). A terminal with such a function (ARP reply control section) is called a corresponding terminal. On the other hand, a terminal without such a function (without the ARP reply control section) is called a 'noncorrespondence terminal'.

When the noncorrespondence terminal is connected in subordination to the layer-2 switches C30 and D40 in the floor LAN 100, there is the possibility that communication is possible from terminal A50 which is the corresponding terminal to the noncorresponding terminal without passing through the security switch 10, for example.

Both the noncorresponding terminal and also the security switch 10 reply to the ARP request frame from terminal A50 and, when terminal A50 adopts an ARP reply from the noncorresponding terminal, the terminal A50 is able to acquire a real MAC address of the noncorresponding terminal. Hence, the noncorresponding terminal is able to acquire the virtual MAC address of terminal A50 and communication using a virtual MAC address can be made via the security switch 10.

In order to prevent such a situation, when the security switch 10 detects the noncorresponding terminal in the fourth embodiment, the virtual MAC address cannot be acquired.

Figure 13:
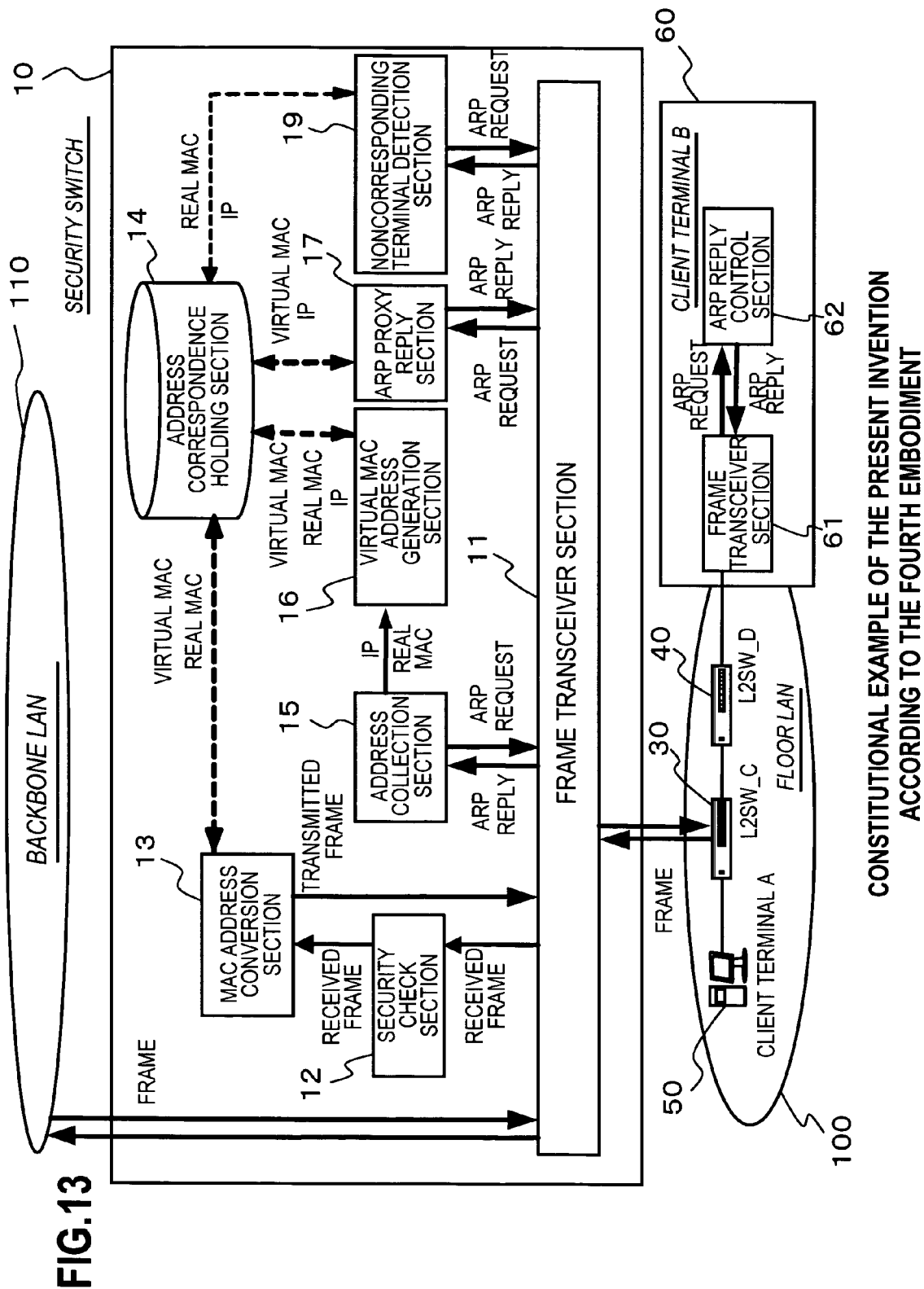
FIG. 13 shows another constitutional example of the security switch and so forth.

FIG. 13 is a constitutional example of terminal B60 and the security switch 10 of the fourth embodiment. In comparison with the first embodiment (FIG. 2), a noncorresponding terminal detection section 19 has been added.

The noncorresponding terminal detection section 19 creates an ARP request frame by means of a source address that is different from its own device address for a real MAC address that is registered in the address correspondence holding section 14 and outputs the ARP request frame to the frame transceiver section 11.

As mentioned earlier, the corresponding terminal has a function that generates an ARP reply frame only in the event of an ARP request frame from the security switch 10. Therefore, when an ARP request frame with a source address which is not the security switch 10 is transmitted to a certain terminal and an ARP reply frame is sent back, the terminal can be judged to be a noncorresponding terminal. When, on the other hand, an ARP reply frame is not sent back, the terminal can be judged to be a corresponding terminal.

The noncorresponding terminal detection section 19 registers flag information indicating whether the noncorresponding terminal is a corresponding terminal on the basis of the judgment result in the address correspondence holding section 14. For example, a corresponding terminal discrimination field in which it is recorded that the corresponding terminal is '1' and the noncorresponding terminal is '0' is added to the address correspondence holding section 14.

Further, when the result of searching the address correspondence holding section 14 is a noncorresponding terminal, the ARP proxy reply section 17 does not generate the ARP reply frame. Otherwise, this is the same as the first embodiment.

Figure 14:
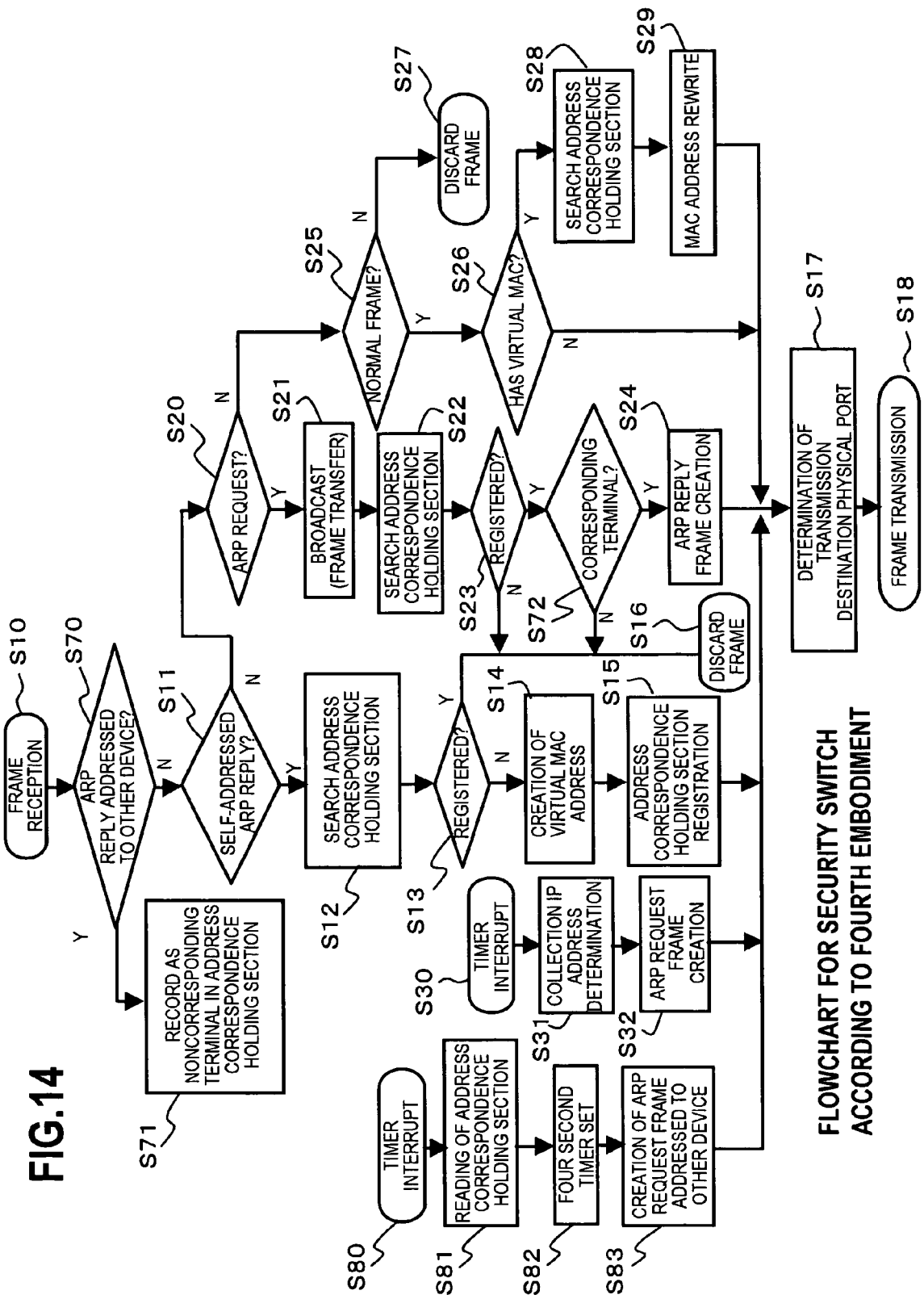
FIG. 14 shows an example of another flowchart that is executed by the security switch.

FIG. 14 is an example of the flowchart of the security switch 10 of the fourth embodiment. The network configuration will be described by means of the example of the third embodiment (FIG. 10). Terminal C70 is the scanning target terminal.

First, the noncorresponding terminal detection section 19 reads the address correspondence holding section 14 by means of the timer interrupt processing (S80) and acquires the destination IP address of the scanning target (S81). Further, the timer is set ('4' seconds, for example) (S82) and creates an ARP request frame the transmission source of which is not the security switch 10 (S83).

For example, suppose that the source MAC address is '00:11:11:11:11:99' and the source IP address is '10.0.0.99' A source address other than that of the security switch 10 may be indicated and an address that is not used by the device in another floor LAN 100 is possible. The destination MAC address is 'FF:FF:FF:FF:FF:FF' and the destination IP address is '10.0.0.4' (IP address of terminal C70).

Further, the frame is transmitted from the frame transceiver section 11 (S17, S18).

If terminal C70 is a corresponding terminal and the IP address (or MAC address) of the transmission source is not that of the security switch 10, the reply frame is not created. If terminal C70 is a noncorresponding terminal, because a reply is made to the ARP request frame, the ARP reply frame is transmitted.

Figures 15, 16:
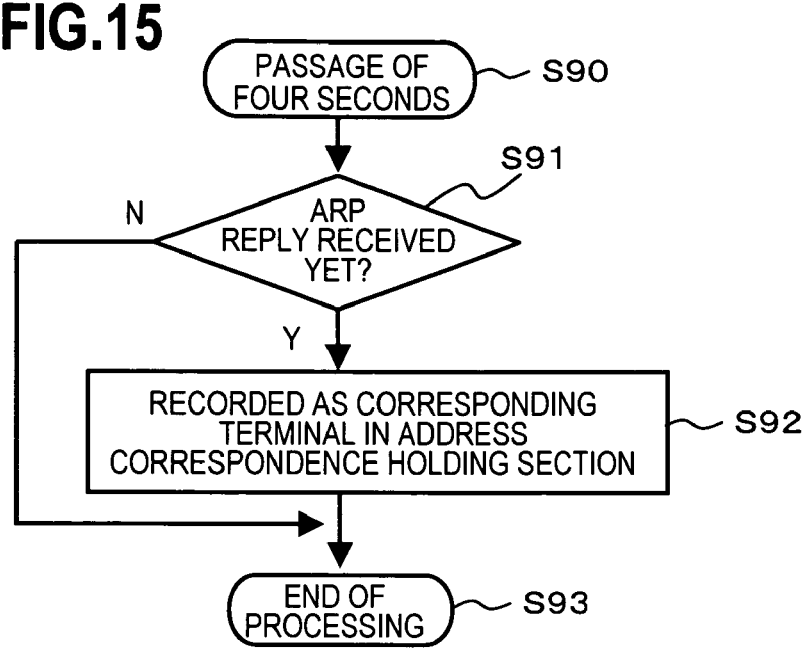
FIG. 15 shows an example of another flowchart that is executed by the security switch.
FIG. 16 shows another constitutional example of the address correspondence holding section.

FIG. 15 is an example of a flowchart for discriminating the noncorresponding terminal of the security switch 10.

When the noncorresponding terminal detection section 19 does not receive the ARP reply frame ('Y' in S91) even when 'four' seconds have elapsed (S90), the terminal is recorded in the address correspondence holding section 14 as a corresponding terminal (S92).

On the other hand, when an ARP reply frame is received ('N' in S91), the processing moves to S10 in FIG. 14 and it is judged whether the ARP reply frame is an ARP reply frame addressed to another device (source MAC address is '00:11:11:11:11:99' and the source IP address is '10.0.0.99') (S70).

If the ARP reply frame is an ARP reply frame addressed to another device ('Y' in S70), the noncorresponding terminal detection section 19 records the terminal being investigated in the address correspondence holding section 14 as a noncorresponding terminal (S71).

FIG. 16 is an example of a table that is stored in the address correspondence holding section 14. This is an example in which terminal C70 is recorded as a noncorresponding terminal.

Further, for the sake of the acquisition of the virtual MAC address, when terminal C70 transmits the ARP request frames addressed to the respective floor terminals ('Y' in S20), the ARP proxy reply section 17 generates an ARP reply frame only in the case of a corresponding terminal ('Y' in S72, S24). When the terminal is not a corresponding terminal ('N' in S72), the received ARP request frame is discarded (S16) and does not generate the ARP reply frame.

As a result, because the noncorresponding terminal is unable to obtain a virtual MAC address, communication cannot be made from the noncorresponding terminal to the corresponding terminal and communication can be blocked. Hence, the terminal that represents a security threat is connected to the floor LAN 100 and the worm or other infection can be prevented from infecting other terminals in the floor LAN 100.

The other processing is the same as that of the first embodiment. Hence, a security switch 10 that improves security can be provided without changing the network configuration also in the fourth embodiment.

Fifth Embodiment

The fifth embodiment will be described next. The fifth embodiment is an example in which, by checking whether another terminal is using the same IP address, changes to the IP address of the terminal and duplication of the IP address as a result of a setting mistake or the like are prevented.

Figure 17:
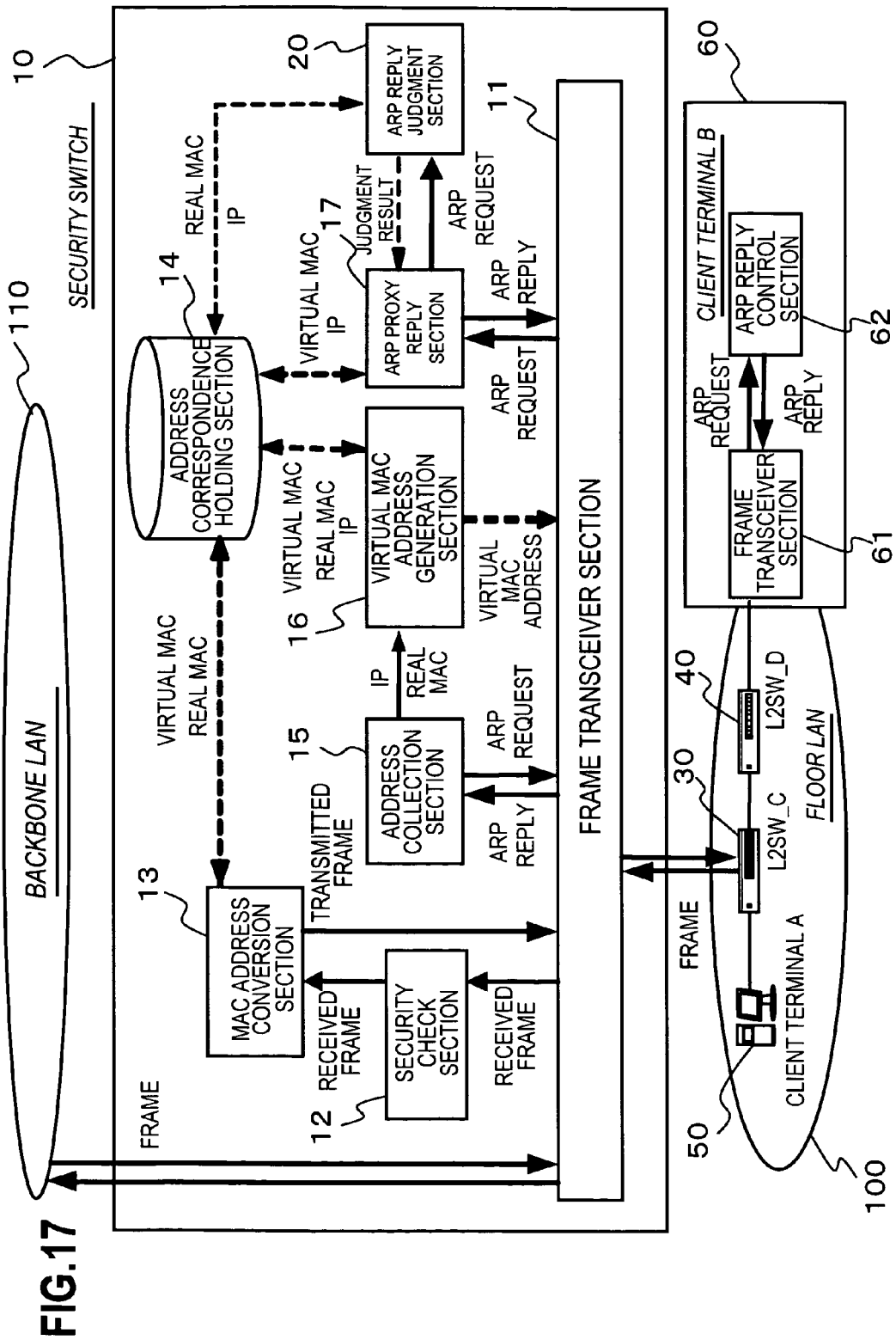
FIG. 17 shows another constitutional example of the security switch and so forth.
Figure 18:
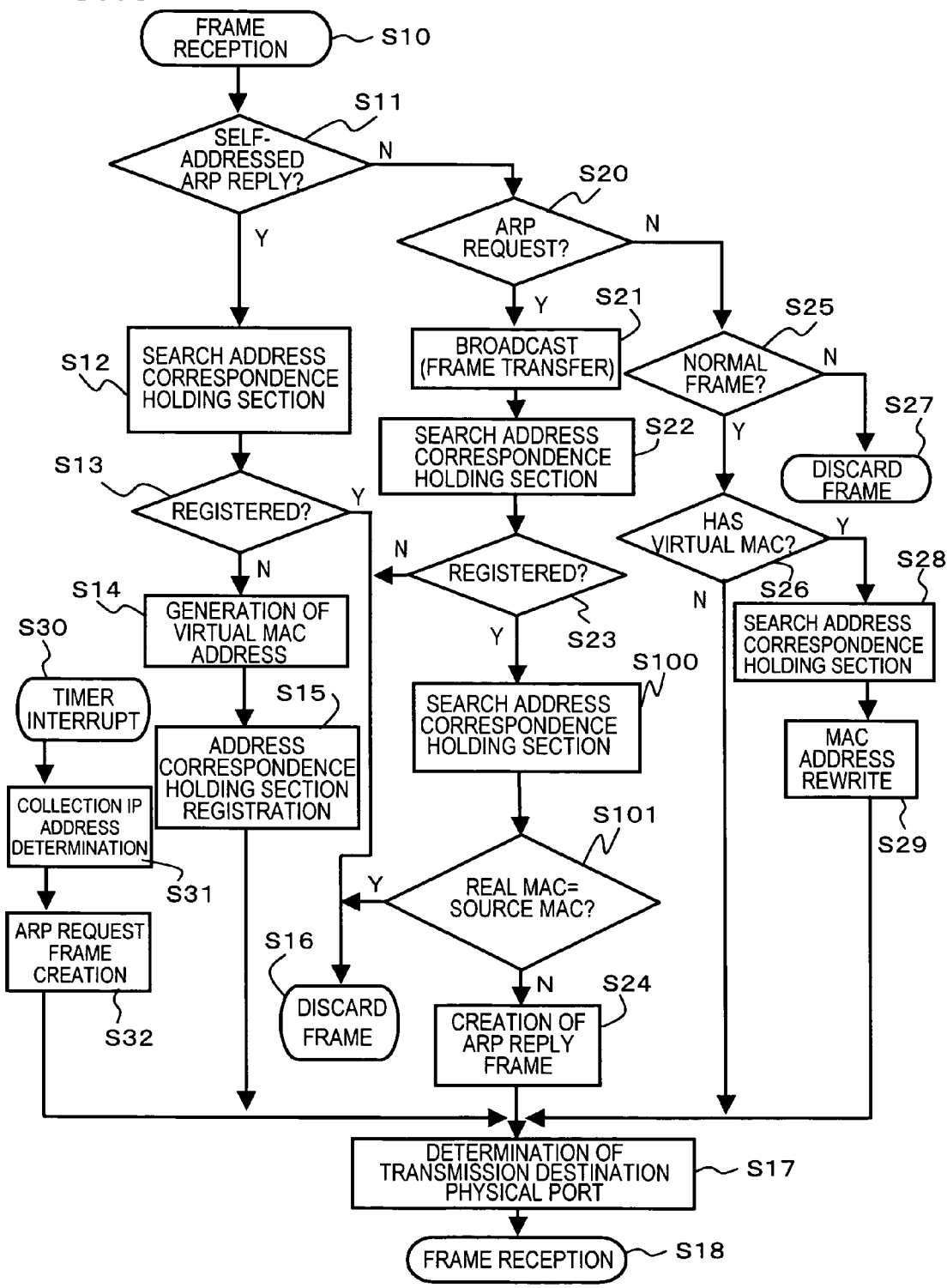
FIG. 18 is an example of another flowchart that is executed by the security switch.

FIG. 17 shows a constitutional example of the security switch 10 and so forth of the fifth embodiment and FIG. 18 shows an example of a flowchart of the security switch 10 of the fifth embodiment.

As shown in FIG. 17, the security switch 10 of the fifth embodiment is obtained by adding an ARP reply judgment section 20 to the first embodiment (FIG. 2).

The ARP reply judgment section 20 judges the existence of the reply to the ARP request frame called a Gratuitous ARP frame that is transmitted from terminal A50 or the like. The Gratuitous ARP frame is a frame in which, when the IP address of terminal A50 or the like is changed, the changed IP address is stored in both fields of the source IP address and destination IP address of the ARP request frame.

Upon receipt of the Gratuitous ARP frame by the ARP proxy reply section 17, the ARP reply judgment section 20 searches the address correspondence holding section 14 by using the address as the search key when the source IP address and the destination IP address are the same.

When the real MAC address obtained as a result of the search and the source MAC address in the Gratuitous ARP frame are the same, a no-reply instruction is output to the ARP proxy reply section 17. In other cases, a reply instruction is output.

A set of the source IP address and source MAC address is registered in the address correspondence holding section 14 or, if (Phase 1) of the first embodiment has not been executed, the set is not registered. If the source IP address of the Gratuitous ARP frame is registered in the address correspondence holding section 14 and the source MAC address corresponding with the IP address is not registered, the IP address is registered as the IP address of another terminal. That is, duplication of the address occurs.

In this case, the security switch 10 must report the fact that duplication of the address has occurred to terminal A50 that transmitted the frame. In the fifth embodiment, when duplication of the IP address occurs, the ARP reply frame is transmitted to terminal A50 and so forth and, if duplication has not occurred, this frame is not transmitted. As a result, terminal A50 or the like that transmitted the Gratuitous ARP frame is able to check the duplication of the IP address.

Further, when the Gratuitous ARP frame is received from the frame transceiver section 11, the ARP proxy reply section 17 outputs the frame to the ARP reply judgment section 20. An ARP reply frame is created only when the reply instruction has been input from the ARP reply judgment section 20.

For example, a case where the terminal A50 performs IP address changes and so forth and transmits a Gratuitous ARP frame may be considered.

The source MAC address is the MAC address ('00:11:11:11:11:02') of terminal A50 and both the source IP address and the destination IP address are both the IP address of terminal A50 ('10.0.0.2') and the destination MAC address is the broadcast address ('FF:FF:FF:FF:FF:FF').

When the frame transceiver section 11 of the security switch 10 receives the frame (S10), the frame transceiver section 11 transfers the frame to the ARP proxy reply section 17 ('N' in S11, 'Y' in S20, S21).

The ARP proxy reply section 17 searches the address correspondence holding section 14 by means of the destination IP address ('10.0.0.2') (S22) and acquires the relevant virtual MAC address ('02:11:11:11:11:02') ('Y' in S23). Further, the ARP proxy reply section 17 outputs the Gratuitous ARP frame to the ARP reply judgment section 20.

The ARP reply judgment section 20 is the same as the source IP address of the frame and the destination IP address and searches the address correspondence holding section 14 (S100). As a result of the search, the ARP reply judgment section 20 acquires the relevant actual MAC address ('00:11:11:11:11:02').

Because the acquired real MAC address and the MAC address ('00:11:11:11:11:02') in the Gratuitous ARP frame are the same ('Y' in S101), the ARP reply judgment section 20 outputs the noncorrespondence instruction to the ARP proxy reply section 17.

Upon receipt of the no-reply instruction, the ARP proxy reply section 17 discards the received Gratuitous ARP frame (S16). As a result, the ARP reply frame is not transmitted to terminal A50 and terminal A50 can grasp the fact that the IP address in the Gratuitous ARP frame (changed IP address) is not used by another terminal.

On the other hand, when terminal B60 transmits a Gratuitous ARP frame with which the IP address ('10.0.0.2') of terminal A50 is the transmission source and the destination IP address, the source MAC address is '00:11:11:11:11:03' and the MAC address acquired from the address correspondence holding section 14 is '00:11:11:11:11:02'. In this case, because the values are different, a reply instruction is issued. Because an ARP reply frame has been sent back by terminal B60, it is clear that the IP address ('10.0.0.2') is being used by another terminal (terminal A50) and address duplication has occurred.

Thereafter, a security switch 10 that improves security without changing the network configuration by performing the same processing as that of the first embodiment can be provided.

Sixth Embodiment

The sixth embodiment will be described next. The sixth embodiment is an example in which a defect caused by the update is corrected for an ARP table stored in the respective terminals A50 and so forth.

As described in the first embodiment and so forth, the respective terminals A50 and so forth have an ARP table in which a set of a MAC address (virtual MAC address or real MAC address) and an IP address are stored.

The ARP table confirms the entry of the ARP table each time an ARP request frame from terminal A50 is received and, when the entry of terminal A50 exists, the entry is updated and, when the entry does not exist, no change is made to the ARP table.

For example, the network configuration shown in FIG. 10 may be considered. In order to acquire a virtual MAC address (Phase 2 of the first embodiment), terminal A50 transmits the ARP request frame to terminal C70. The source address of the frame is the IP and real MAC address of terminal A50.

Terminal B60 receives the frame if the IP address of terminal A50 exists in the ARP table. As described in the first embodiment or the like, the frame is not a frame addressed to terminal B60 and the terminal B60 discards the frame ('N' in S41, S47).

Figure 19:
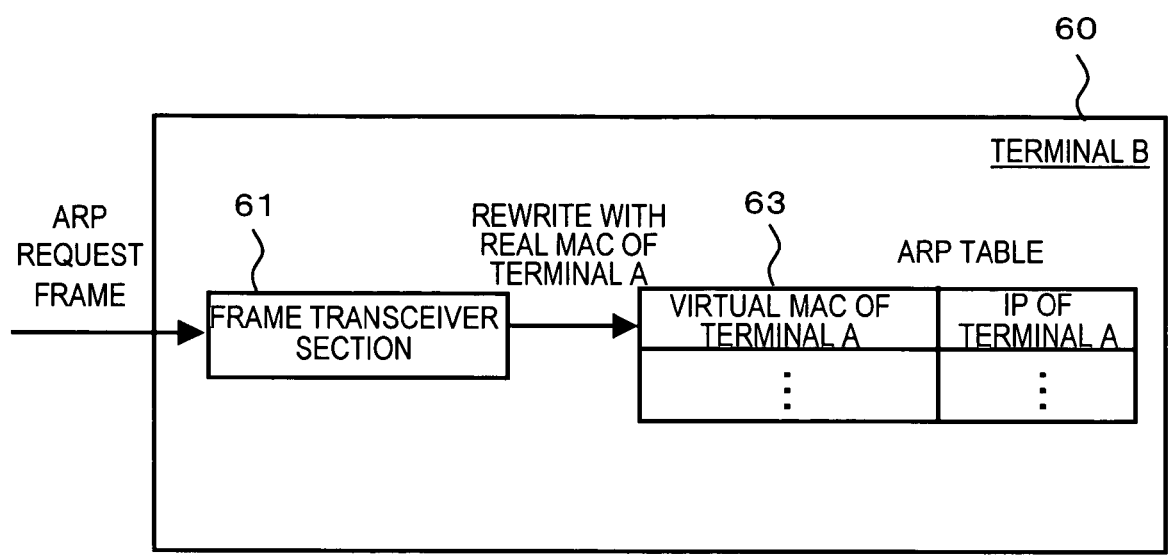
FIG. 19 shows another constitutional example of terminal B.

However, as shown in FIG. 19, if the IP address of terminal A50 exists in the ARP table 63, a terminal-side frame transceiver section 61 rewrites the corresponding virtual MAC address with the real MAC address of terminal A50. As a result of the rewriting to the real MAC address, terminal B60 acquires the real MAC address of terminal A50 and communication can be performed without passage through the security switch 10.

Therefore, according to the sixth embodiment, in order to prevent such a situation, when the ARP request frame is transmitted in order to acquire a virtual MAC address from each terminal, an ARP request frame the source IP address of which is an IP address other than its own IP address (the source MAC address is its own MAC address) is transmitted.

In this case, because the entry of the IP address applied to the ARP table 63 has not been registered by another terminal, the frame is not received. Accordingly, because the virtual MAC address of the ARP table 63 is not rewritten with a real MAC address, the frames transmitted from the respective terminals can pass through the security switch 10. Higher security can accordingly be secured.

When the constitution itself of terminal A50 is the same as that of the first embodiment (FIG. 2) and a frame is transmitted, for example, the terminal-side frame transceiver section may store an address other than its own IP address in the frame and transmit the frame.

Further, as an example of a source IP address that is stored in the ARP request frame other than its own IP address, an IP address that has not been allocated to a terminal in the same subnet ('10.0.5' to '10.0.0.256' and so forth in the example in FIG. 10, for example) may be used.

Here, the sixth embodiment is a frame for which the source IP address and destination IP address are different when the frame is used as the Gratuitous ARP frame of the fifth embodiment. The ARP reply control section 62 discriminates the frame by checking that the set of the destination IP address, which indicates that the source IP address is the special IP address or the Gratuitous ARP frame, and the source address is registered in the ARP reply control section 62.

Naturally, the sixth embodiment allows the first embodiment above to be implemented and exhibits the same operating effects as those of the first embodiment and so forth.

Seventh Embodiment

The seventh embodiment will be described next. The seventh embodiment is an example of log collection and can be implemented by any of the first to sixth embodiments hereinabove.

Figure 20:
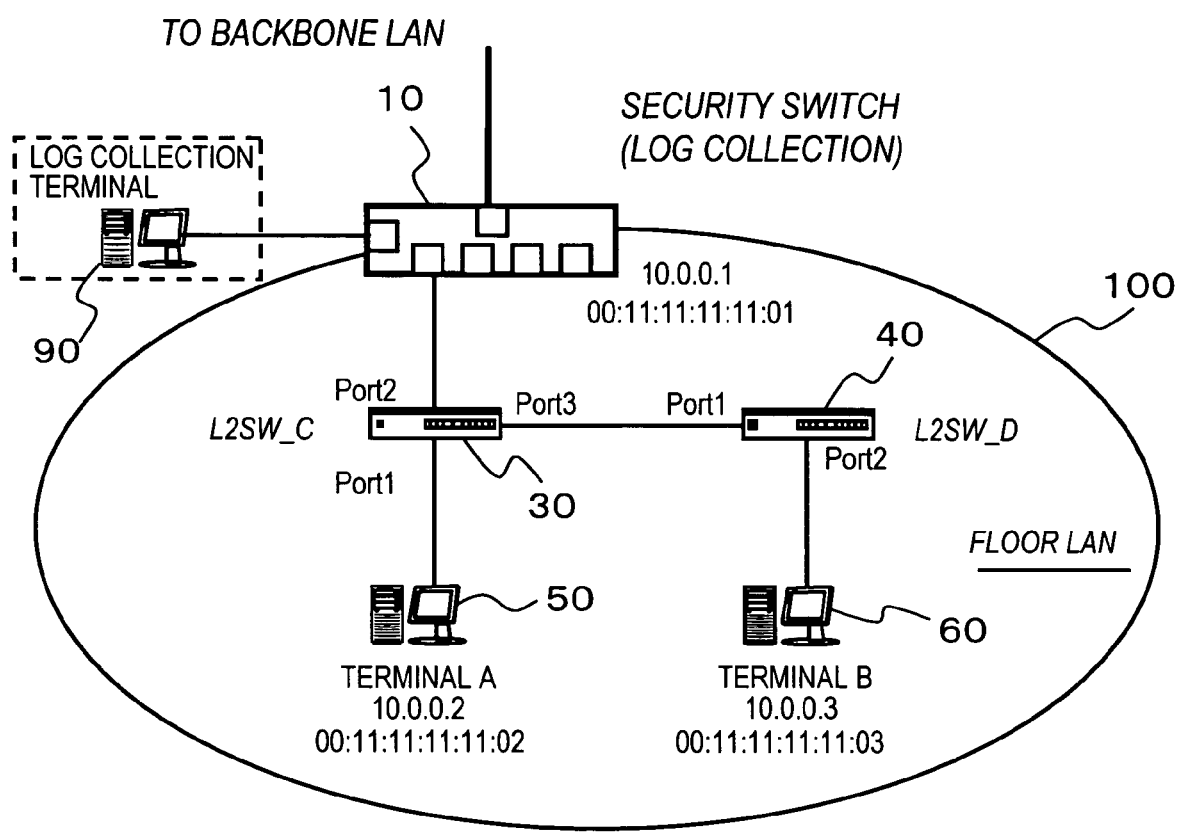
FIG. 20 shows another constitutional example of the network.

FIG. 20 is an example of the network configuration of the seventh embodiment. Logs of the communications between terminals A50 and B60 are collected by the security switch 10 or by a log collection terminal 90. The remaining constitution is the same as that of the first embodiment.

A case where logs are collected by the security switch 10 involves installing a storage device (hard disk or memory or the like) in the security switch 10 and the security switch 10 storing the logs of the received frames in the storage device.

A case where logs are collected by the log collection terminal 90 involves connecting the log collection terminal 90 (dot-chain frame in FIG. 20) to a specified port of the security switch 10, copying the frame to the port when the security switch 10 receives the frame, and the log collection terminal 90 collecting logs of the frames transferred from the security switch 10.

These logs can be collected because a path through the security switch 10 is established in the communication made between terminals A50 and B60 as a result of (Phase 3) in the first embodiment, for example.

FIG. 21 shows an example of logs collected in the security switch 10 or log collection terminal 90. This is an example of log data that uses a tool such as a 'tcpdump' when telnet communication is performed from terminal A50 ('10.0.0.2') to terminal B60 ('10.0.0.3'), for example. This is an example of four frames' worth of log data. Such log data is recorded in the storage device of the security switch 10 or the log collection terminal 90.

Figure 22:
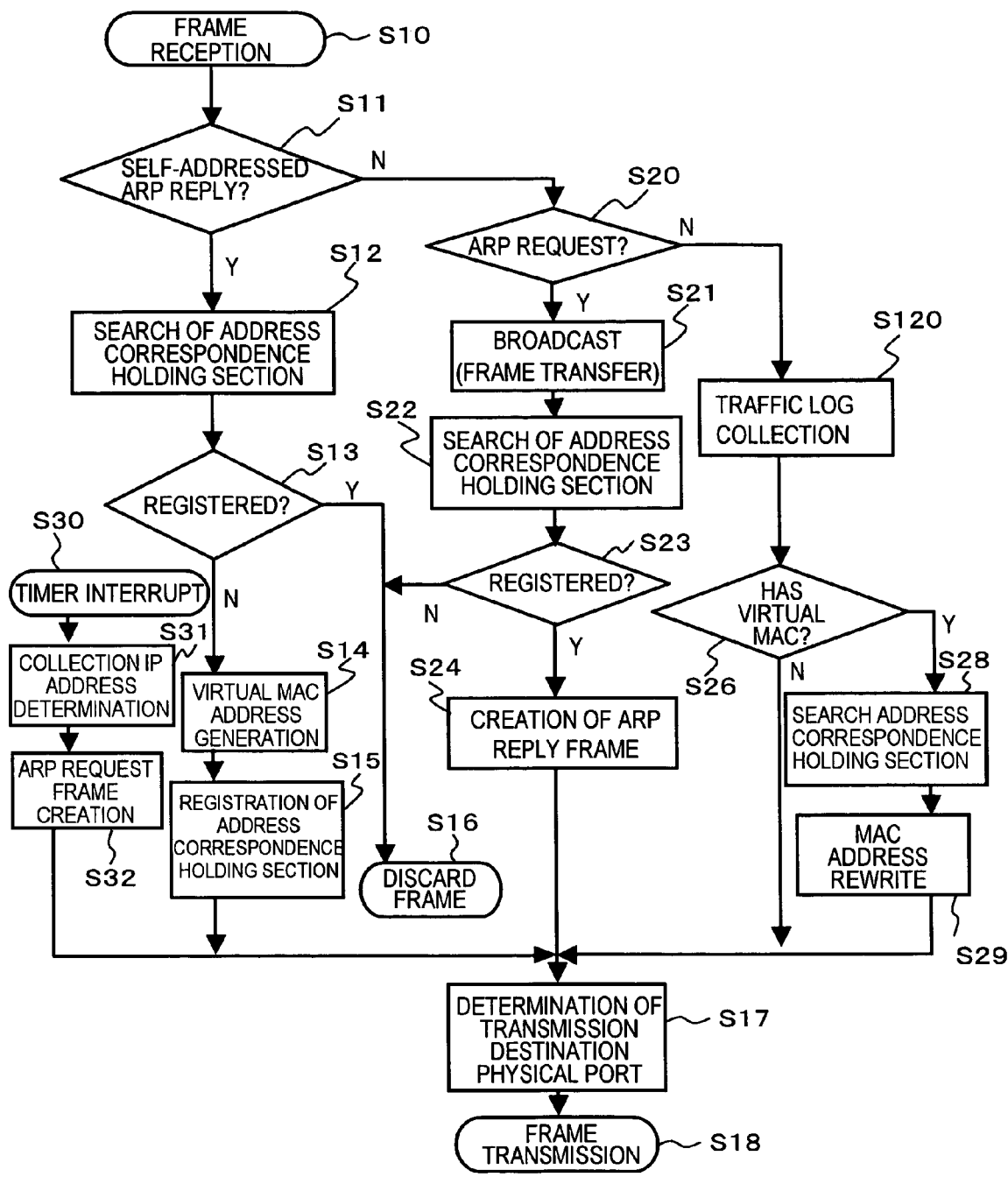
FIG. 22 is an example of another flowchart that is executed by the security switch.
Figure 24A:
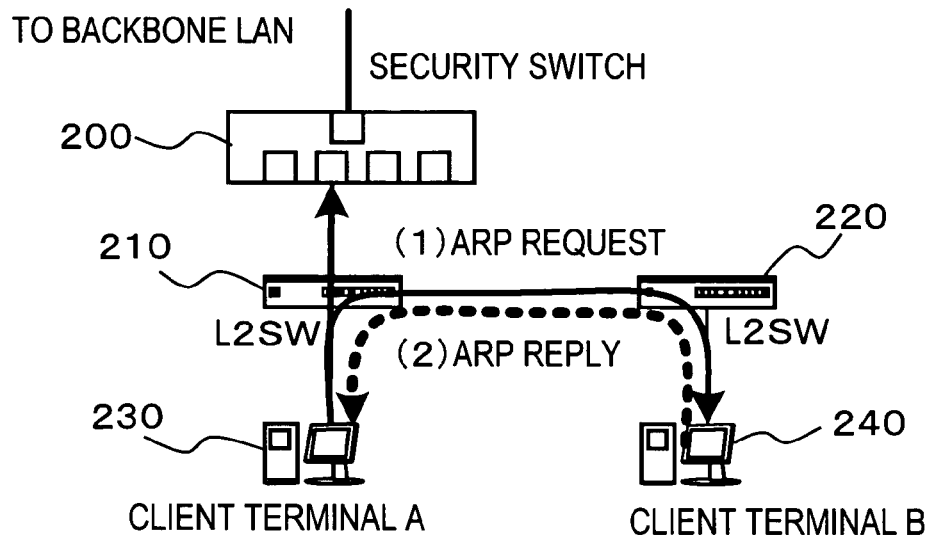
FIG. 24A shows an example of conventional ARP communication and FIG. 24B shows an example of communication in a conventional floor LAN.
Figure 24B:
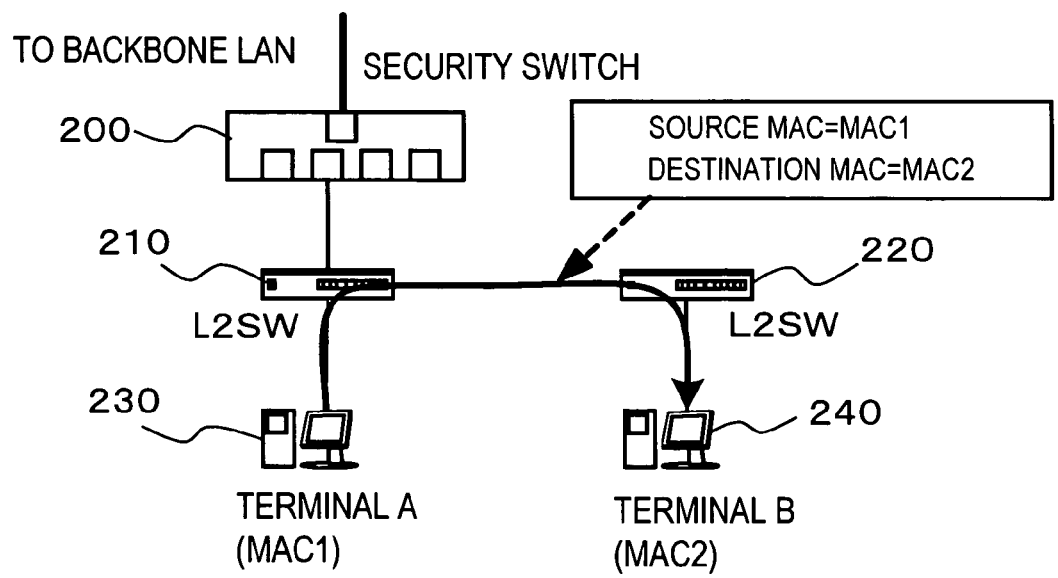

FIGS. 22 and 23 are examples of flowcharts of the security switch 10 that include log collection.

FIG. 22 shows an example of a case where a security check is not executed and only log collection is performed and FIG. 23 shows an example of a case where both a security check and log collection are performed.

As shown in FIG. 22, when the received frame is neither an ARP reply frame addressed to the security switch 10 itself ('N' in S11 of FIG. 22) nor an ARP request frame ('N' in S20), the security switch 10 collects traffic logs (S120). The logs are stored in the storage device of the security switch 10 and transferred to the log collection terminal 90, for example. The subsequent processing is the same as that of the first embodiment.

On the other hand, when both the security check and also the log collection are performed, the security switch 10 performs log collection (S120) and then performs normal frame confirmation (S25), as shown in FIG. 23. The subsequent processing is the same as that of the first embodiment.

Thus, in the seventh embodiment, the logs of the frames transmitted between terminals A50 and B60 can be collected by the security switch 10 or the log collection terminal 90. Because the first embodiment or the like can also be implemented, the same effects as those of the first embodiment are also exhibited.

What is claimed is:

1. A relay device in which a single or a plurality of layer-2 switches are connected in subordination to the same physical port and a single or a plurality of terminals are connected in subordination to the layer-2 switches, comprising:
   an address correspondence holding unit which holds, for each of the terminals, an IP address and real MAC address of the terminal and a virtual MAC address being a MAC address that is virtual;
   a proxy reply hardware unit which reads the virtual MAC address of the corresponding terminal from the address correspondence holding unit upon receiving a first ARP request frame that seeks acquisition of the virtual MAC address from the terminal, and sends back the virtual MAC address to the terminal;
   a MAC address conversion unit that receives a first frame addressed to the virtual MAC address, when the first frame is sent and received between the terminals, performs conversion of the virtual MAC address and real MAC address for the MAC address of the first frame, and sends back a converted second frame; and
   a terminal connection port holding unit which holds connection-destination physical port information,
   wherein the proxy reply hardware unit sends back the virtual MAC address when judging that communication is in subordination to the same physical port on the basis of the physical port information and sends back the real MAC address when judging that communication is in subordination to another physical port, when the first ARP request frame has been received.

2. The relay device according to claim 1, further comprising:
   an address collection unit which transmits a second ARP request frame at regular intervals to all of the terminals connected via the layer-2 switch and collects correspondence between the IP address and MAC address of the terminal by a reply frame with respect to the second ARP request frame; and
   a virtual MAC address generation unit that allocates the virtual MAC address to the IP address and the MAC address thus collected,
   wherein the virtual MAC address generation unit registers the allocated virtual MAC address, the IP address and the MAC address in the address correspondence holding unit.

3. The relay device according to claim 2, wherein the virtual MAC address generation unit searches the address correspondence holding unit based on the collected IP address and MAC address and allocates the virtual MAC address when the virtual MAC address corresponding with the IP address and the MAC address has not been registered in the address correspondence holding unit.

4. The relay device according to claim 1, further comprising:
   an address collection unit which receives a third frame that is transmitted from the terminal and collects the correspondence between the IP address and MAC address of the terminal from the third frame; and
   a virtual MAC address generation unit which allocates the virtual MAC address based on the collected IP address and MAC address,
   wherein the virtual MAC address generation unit registers the allocated virtual MAC address, the IP address, and the MAC address in the address correspondence holding unit.

5. The relay device according to claim 1, further comprising:
   a noncorresponding terminal detection unit which transmits a third ARP request frame by a source address that differs from the address of the relay device, wherein the noncorresponding terminal detection unit specifies whether the terminal that has received the third ARP request frame is a corresponding terminal that sends back only the first ARP request frame for which the relay device is the source address on the basis of a reply frame with respect to the third ARP request frame.

6. The relay device according to claim 5, wherein the noncorresponding terminal detection unit specifies the terminal as the corresponding terminal when the reply frame with respect to the third ARP frame is not received from the terminal and specifies the terminal as a terminal that is not the corresponding terminal when the reply frame is received.

7. The relay device according to claim 1, further comprising:
a reply judgment unit which judges duplication of the IP address upon receiving a fourth ARP request frame, for which the IP addresses of the transmission source and destination are the same, which is transmitted from the terminal,
wherein the proxy reply unit replies or does not reply to the fourth ARP frame in accordance with the judgment result of the reply judgment section.

8. The relay device according to claim 7, wherein the reply judgment unit searches the address correspondence holding unit by taking the source IP address of the fourth ARP request frame as a search key upon receiving the fourth ARP request frame from the terminal, and judges that the source IP address is a duplicate if the real MAC address corresponding with the source IP address has not been registered, and
the proxy reply unit replies to the terminal upon obtaining the judgment result that the duplicate exists.

9. The relay device according to claim 1, further comprising:
a log collection unit which collects logs of the first frame sent and received between the terminals.

10. The relay device according to claim 1, wherein the layer-2 switch holds a learning table in which the virtual MAC address and connection port information contained in a reply frame with respect to the first ARP request frame are stored when the reply frame is transmitted from the relay device to the terminal; and
the first frame is transmitted to the relay device by referencing the learning table when the first frame is transmitted from the terminal.

11. The relay device according to claim 1, further comprising:
a security check unit which discards the first frame when a problem with security of the first frame exists and outputs the first frame to the MAC address conversion unit when no such problem exists,
wherein the MAC address conversion unit performs conversion of the MAC address for the normal first frame.

12. The relay device according to claim 1, wherein the proxy reply unit compares the physical port information with a port number of the relay device received the first ARP request frame, judges that communication is in subordination to the same physical port when a match exists between the physical port information and the port number, and judges that communication is in subordination to another physical port when no such match exists.

13. A network system in which a single or a plurality of layer-2 switches are connected in subordination to the same physical port of the relay device and a single or a plurality of terminals are connected in subordination to the layer-2 switches,
wherein the relay device comprises:
an address correspondence holding unit which holds, for each of the terminals, an IP address and real MAC address of the terminal and a virtual MAC address being a MAC address that is virtual;
a proxy reply unit which, when a first ARP request frame that seeks acquisition of the virtual MAC address from the terminal is received, reads the virtual MAC address of the corresponding terminal from the address correspondence holding unit and sends back the virtual MAC address to the terminal;
a MAC address conversion unit which receives a first frame addressed to the virtual MAC address when the first frame is sent and received between the terminals, performs conversion of the virtual MAC address and real MAC address for the MAC address of the first frame, and sends back a converted second frame; and
a terminal connection port holding unit which holds connection-destination physical port information,
the terminal comprises a reply control unit that replies only to a reply frame from the relay device, and
the proxy reply unit sends back the virtual MAC address when judging that communication is in subordination to the same physical port on the basis of the physical port information and sends back the real MAC address when judging that communication is in subordination to another physical port, when the first ARP request frame has been received.

14. The network system according to claim 13, wherein the reply control unit checks a source of a received ARP request frame, and generates an ARP reply frame only to the relay device that transmitted the ARP request frame.

15. A path control method for a relay device in which a single or a plurality of layer-2 switches are connected in subordination to the same physical port and in which a single or a plurality of terminals are connected in subordination to the layer-2 switches, the method comprising:
receiving a first ARP reply frame from the terminal,
reading a virtual MAC address of the corresponding terminal on the basis of the received first ARP reply frame from an address correspondence holding unit that holds, for each of the terminals, an IP address and real MAC address of the terminal and the virtual MAC address being a MAC address that is virtual, and sending back the virtual MAC address to the terminal,
receiving a first frame addressed to the virtual MAC address when the first frame is sent and received between the terminals, performing conversion of the virtual MAC address and real MAC address with respect to the MAC address of the first frame, and sending back a converted second frame, and
sending back the virtual MAC address when judging that communication is in subordination to the same physical port on the basis of connection-destination physical port information held in a terminal connection port holding unit, and sending back the real MAC address when judging that communication is in subordination to another physical port, when the first ARP request frame has been received.

* * * * *